United States Patent
Nishiyama et al.

(10) Patent No.: US 9,581,987 B2
(45) Date of Patent: Feb. 28, 2017

(54) DEVICE CONTROL APPARATUS, PROGRAM, DEVICE CONTROL SERVER, AND DEVICE CONTROL SYSTEM, FOR DETERMINING CONTROL CONTENTS OF LOAD DEVICE BY PERFORMING NEGOTIATION ON BEHALF OF USER

(71) Applicant: Panasonic Corporation, Osaka (JP)

(72) Inventors: Takashi Nishiyama, Hyogo (JP); Tetsuo Sawaragi, Kyoto (JP)

(73) Assignee: Panasonic Corporation, Osaka (JP)

( * ) Notice: Subject to any disclaimer, the term of this patent is extended or adjusted under 35 U.S.C. 154(b) by 425 days.

(21) Appl. No.: 14/342,417

(22) PCT Filed: Dec. 11, 2012

(86) PCT No.: PCT/JP2012/082032
§ 371 (c)(1),
(2) Date: Mar. 3, 2014

(87) PCT Pub. No.: WO2013/103071
PCT Pub. Date: Jul. 11, 2013

(65) Prior Publication Data
US 2014/0222215 A1    Aug. 7, 2014

(30) Foreign Application Priority Data

Jan. 6, 2012 (JP) ................................ 2012-001598
Aug. 31, 2012 (JP) ................................ 2012-192154

(51) Int. Cl.
*G02B 15/02* (2006.01)
*G05B 15/02* (2006.01)
(Continued)

(52) U.S. Cl.
CPC ............ *G05B 15/02* (2013.01); *H04L 12/282* (2013.01); *H04L 12/2821* (2013.01);
(Continued)

(58) Field of Classification Search
CPC .................................................... G05B 15/02
(Continued)

(56) References Cited

U.S. PATENT DOCUMENTS

| 6,530,083 | B1 | 3/2003 | Liebenow |
| 6,754,504 | B1 | 6/2004 | Reed |
| 2009/0023393 | A1 | 1/2009 | Behzad et al. |

FOREIGN PATENT DOCUMENTS

| JP | 2004-060978 A | 2/2004 |
| JP | 2005-172288 A | 6/2005 |

(Continued)

OTHER PUBLICATIONS

Extended European Search Report dated Aug. 17, 2015 for corresponding European Application No. 12864100.8.
(Continued)

*Primary Examiner* — Tejal Gami
(74) *Attorney, Agent, or Firm* — Renner, Otto, Boisselle & Sklar, LLP

(57) ABSTRACT

An agent 10 is associated with a user as a representative of the user. The agent 10 includes a utility value calculation unit 15 that calculates an expected utility value indicating utility for the user with respect to an operating condition of the load device 20 and a cooperation processing unit 16 that judges whether an operating condition of the load device 20 is acceptable or not to the user and uniquely determines an operating condition to be instructed to the load device if the operating condition is not acceptable to the user cooperating with other agents 10. Agents 10 that do not accept the operating condition of the load device 20 determine the operating condition of the load device 20 such that one agent acting as a manager and the other agent acting as a contractor so as to make (some) concession to each other.

15 Claims, 8 Drawing Sheets

(51) Int. Cl.
*H05B 37/02* (2006.01)
*H04L 12/28* (2006.01)
*F24F 11/00* (2006.01)

(52) U.S. Cl.
CPC ........ *H05B 37/0272* (2013.01); *F24F 11/006* (2013.01); *F24F 2011/0057* (2013.01); *G05B 2219/2642* (2013.01); *H04L 2012/285* (2013.01); *H04L 2012/2841* (2013.01)

(58) Field of Classification Search
USPC .......................................................... 700/275
See application file for complete search history.

(56) References Cited

FOREIGN PATENT DOCUMENTS

| | | | |
|---|---|---|---|
| JP | 2008-232533 A | 10/2008 |
| JP | 2010-002159 A | 1/2010 |

OTHER PUBLICATIONS

International Search Report for corresponding International Application No. PCT/JP2012/082032 mailed Mar. 19, 2013.
Form PCT/ISA/237 for corresponding International Application No. PCT/JP2012/082032 dated Mar. 19, 2013.
R.G. Smith, "The Contract Net Protocol: High-Level Communication and Control in a Distributed Problem Solver", IEEE Transactions on Computers, vol. C-29, No. 12, pp. 1104-1113 (1980).

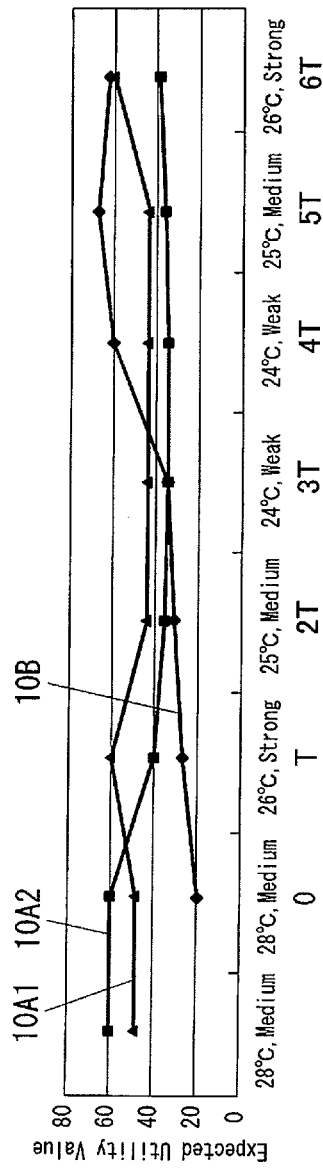
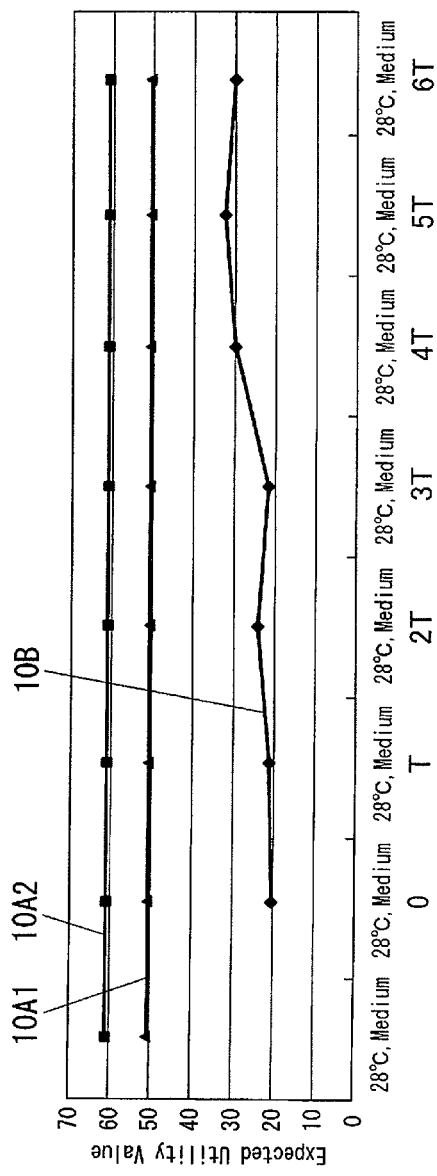
FIG. 7
FIG. 8

DEVICE CONTROL APPARATUS, PROGRAM, DEVICE CONTROL SERVER, AND DEVICE CONTROL SYSTEM, FOR DETERMINING CONTROL CONTENTS OF LOAD DEVICE BY PERFORMING NEGOTIATION ON BEHALF OF USER

TECHNICAL FIELD

The invention relates to: a device control apparatus configured to supply control instruction to a load device that adjusts a surrounding environment of a user, mainly in a building, as a representative of the user and also to determine control contents of the load device, when competing with other user(s) with respect to the control contents of the load device, by negotiating with the other user(s) on behalf of the user; a program to cause a computer to function as the device control apparatus; and a device control server and a device control system that have the function of the device control apparatuses that act as representatives of a plurality of users.

BACKGROUND ART

In general, in a building such as a residence, an office building, and a commercial facility, load devices such as air conditioners and lighting devices are widely used in order to adjust a surrounding environment of a user. When a plurality of users are in a space in which an environment is formed by this kind of load device, an agreement may be necessary among the users for determining the operating condition of the load device.

For example, in a case where the load device is an air conditioner and a plurality of users are in a room in which cooling is performed, it is possible that a user who attaches importance to comfort and prefers a lower temperature setting and a user who attaches importance to energy saving and prefers a higher temperature setting may co-exist. In this case, a situation may happen in which an agreement between the users about the temperature setting cannot be reached.

In order to deal with this kind of problem, for example, Japanese Patent Application Publication 2005-172288 (hereinafter referred to as Document 1) proposes an air conditioning apparatus control system that is configured to judge whether a person entering a room is a registered user or not, and to determine, if the person is one of the registered users, the temperature setting so as to reflect the preference of the user. The technique described in Document 1 determines the temperature setting, when there are a plurality of users, by modifying each of preferred temperature ranges that are set respectively for the users using a weighting function so as to take care of potentially disadvantaged or vulnerable users with consideration for the gender and age of each of the users.

Incidentally, in the technique described in Document 1, since the temperature setting is derived by modifying each of preferred temperature ranges that are set respectively for the users using a weighting function according to the priority of each of the users, it may not be possible to set the temperature such that all the users are satisfied. In the technique described in Document 1, the temperature setting is performed in which the preference of a user who is considered to be the vulnerable is prioritized, and the temperature setting cannot be determined taking comfort, energy saving, or the like into consideration. Furthermore, in the technique described in Document 1, since only the temperature is taken into consideration, the technique described in Document 1 can be used for the purpose of determining a temperature setting of an air-conditioner, but cannot be applied to a load device such as a lighting device.

SUMMARY OF INVENTION

An object of the present invention is to provide: a device control apparatus that, when there are a plurality of users in a space in which a load device is used, is capable of determining an operating condition with which agreement is easily reached while reflecting sense of values regarding comfort, energy saving and the like of each of the users; a program to cause a computer to function as the device control apparatus; and a device control server and a device control system that realize the function of the device control apparatus.

A device control apparatus according to the present invention is a device control apparatus for controlling a load device according to an operating condition of the load device determined by an agent that is associated with a user who is in a space in which an environment is formed by the load device and that is realized as a representative of the user by a computer. The agent includes: a utility value calculation unit configured to calculate an expected utility value indicating utility for the user with respect to an operating condition of the load device acquired from the load device, using an attribute of the user; and a cooperation processing unit configured to judge whether an operating condition of the load device is acceptable or not to the user by evaluating the expected utility value calculated for the user, and to uniquely determine an operating condition to be instructed to the load device if the operating condition is not acceptable to the user. The cooperation processing unit includes: an evaluation unit configured to classify the expected utility value, by comparing the expected utility value with a judgment threshold, into one of at least three levels of a first case that is desirable for the user, a second case that is undesirable for the user, and a third case that is neither desirable nor undesirable for the user; a planning unit configured to plan an operating condition of the load device, when a result of the evaluation by the evaluation unit is the second case, such that the evaluation result of the expected utility value becomes the third case; a proposing unit configured to, when there is a plurality of users in the space, propose the operating condition of the load device planned by the planning unit to agents that are representatives of other users; a response unit configured to, when the evaluation unit judges that the operating condition of the load device proposed by a proposing unit of an agent that made the proposal is the second case, return a response refusing the proposal to the agent that made the proposal; and a negotiation unit configured to, upon receiving a response refusing the proposal from a response unit of an agent, negotiate such that the evaluation result of the expected utility value becomes the first case or the third case in each of a manager and a contractor, the manager being the agent that made the proposal, the contractor being the agent that refused the proposal.

It is preferable that, in this device control apparatus, the agent further includes a consensus-building unit that is configured to, when the agent is the contractor, change the judgment threshold used in the evaluation unit so as to improve an evaluation result of the expected utility value.

It is preferable that, in this device control apparatus, the agent limits a period in which the judgment threshold is changed so as to improve an evaluation result of the expected utility value to be until a point of time when a next evaluation of the expected utility value is performed, and restores the judgment threshold to the original judgment threshold at the point of time.

It is preferable that, in this device control apparatus, the agent stores a number of times that the judgment threshold has been changed as a number of concessions, and increments the number of concessions by 1 every time the judgment threshold is changed.

It is preferable that, in this device control apparatus, after the evaluation result of the expected utility value becomes the first case or the third case in each of the manager and the contractor, an agent which has been the contractor and which has the number of concessions of not 0 proposes, to the other agents, an operating condition of the load device that improves the expected utility value, and the cooperation processing unit of the agent decrements the number of concessions by 1 when a result of evaluation of the expected utility value in each of the other agents with respect to the proposed operating condition is the first case or the third case.

It is preferable that, in this device control apparatus, each user is associated with one agent that is provided to a terminal device carried by the user, and the agents communicate with each other via wireless communication.

A program according to the present invention is a program causing a computer to function as an agent for controlling a load device according to an operating condition of the load device determined by the agent that is associated with a user who is in a space in which an environment is formed by the load device and that is realized as a representative of the user by the computer. The agent includes: a utility value calculation unit configured to calculate an expected utility value indicating utility for the user with respect to an operating condition of the load device acquired from the load device, using an attribute of the user; and a cooperation processing unit configured to judge whether an operating condition of the load device is acceptable or not to the user by evaluating the expected utility value calculated for the user, and to uniquely determine an operating condition to be instructed to the load device if the operating condition is not acceptable to the user. The cooperation processing unit includes: an evaluation unit configured to classify the expected utility value, by comparing the expected utility value with a judgment threshold, into one of at least three levels of a first case that is desirable for the user, a second case that is undesirable for the user, and a third case that is neither desirable nor undesirable for the user; a planning unit configured to plan an operating condition of the load device, when a result of the evaluation by the evaluation unit is the second case, such that the evaluation result of the expected utility value becomes the third case; a proposing unit configured to, when there is a plurality of users in the space, propose the operating condition of the load device planned by the planning unit to agents that are representatives of other users; a response unit configured to, when the evaluation unit judges that the operating condition of the load device proposed by a proposing unit of an agent that made the proposal is the second case, return a response refusing the proposal to the agent that made the proposal; and a negotiation unit configured to, upon receiving a response refusing the proposal from a response unit of an agent, negotiate such that the evaluation result of the expected utility value becomes the first case or the third case in each of a manager and a contractor, the manager being the agent that made the proposal, the contractor being the agent that refused the proposal.

That is to say, the program according to the present invention is to cause a computer to function as the agent of the device control apparatus.

It is preferable that the aforementioned program is stored in a storage medium.

A device control server according to the present invention is a device control server on which agents that respectively represent a plurality of users are installed for controlling a load device according to an operating condition of the load device determined by the agent that is associated with a user who is in a space in which an environment is formed by the load device and that is realized as a representative of the user by a computer. The agent includes: a utility value calculation unit configured to calculate an expected utility value indicating utility for the user with respect to an operating condition of the load device acquired from the load device, using an attribute of the user; and a cooperation processing unit configured to judge whether an operating condition of the load device is acceptable or not to the user by evaluating the expected utility value calculated for the user, and to uniquely determine an operating condition to be instructed to the load device if the operating condition is not acceptable to the user. The cooperation processing unit includes: an evaluation unit configured to classify the expected utility value, by comparing the expected utility value with a judgment threshold, into one of at least three levels of a first case that is desirable for the user, a second case that is undesirable for the user, and a third case that is neither desirable nor undesirable for the user; a planning unit configured to plan an operating condition of the load device, when a result of the evaluation by the evaluation unit is the second case, such that the evaluation result of the expected utility value becomes the third case; a proposing unit configured to, when there is a plurality of users in the space, propose the operating condition of the load device planned by the planning unit to agents that are representatives of other users; a response unit configured to, when the evaluation unit judges that the operating condition of the load device proposed by a proposing unit of an agent that made the proposal is the second case, return a response refusing the proposal to the agent that made the proposal; and a negotiation unit configured to, upon receiving a response refusing the proposal from a response unit of an agent, negotiate such that the evaluation result of the expected utility value becomes the first case or the third case in each of a manager and a contractor, the manager being the agent that made the proposal, the contractor being the agent that refused the proposal.

That is to say, the device control server according to the present invention is the device control apparatus. A plurality of the agents are installed in the device control apparatus, and each of the agents includes the utility value calculation unit and the cooperation processing unit.

A device control system according to the invention is a device control system for controlling a load device according to an operating condition of the load device determined by an agent that is associated with a user who is in a room in which an environment is formed by the load device and that is realized as a representative of the user by a computer. The device control system includes an entrance and exit sensor that is configured to monitor an entrance to and exit from the room. The agent includes: an entrance and exit monitoring unit that is notified of an entrance and exit of the user who is represented by the agent from the entrance and exit sensor; a utility value calculation unit configured to calculate an expected utility value indicating utility for the user with respect to an operating condition of the load device acquired from the load device, using an attribute of the user; and a cooperation processing unit configured to judge whether an operating condition of the load device is acceptable or not to the user by evaluating the expected utility value calculated for the user, and to uniquely determine an operating condition to be instructed to the load device if the operating condition is not acceptable to the user. The cooperation processing unit includes: an evaluation unit configured to classify the expected utility value, by comparing the expected utility value with a judgment threshold, into one of at least three levels of a first case that is desirable for the user, a second case that is undesirable for the user, and a third case that is neither desirable nor undesirable for the user; a planning unit configured, upon being notified an entrance of the user from the entrance and exit monitoring unit, to obtain an evaluation result by the evaluation unit and to plan an operating condition of the load device, when a result of the evaluation by the evaluation unit is the second case, such that the evaluation result of the expected utility value becomes the third case; a proposing unit configured to, when there is a plurality of users in the space, propose the operating condition of the load device planned by the planning unit to agents that are representatives of other users; a response unit configured to, when the evaluation unit judges that the operating condition of the load device proposed by a proposing unit of an agent that made the proposal is the second case, return a response refusing the proposal to the agent that made the proposal; and a negotiation unit configured to, upon receiving a response refusing the proposal from a response unit of an agent, negotiate such that the evaluation result of the expected utility value becomes the first case or the third case in each of a manager and a contractor, the manager being the agent that made the proposal, the contractor being the agent that refused the proposal.

That is to say, the device control system of the present invention includes: the device control apparatus provided with the agent; and an entrance and exit sensor configured to monitor an entrance to and exit from the room of a user in which an environment is formed by the load device. The agent further includes an entrance and exit monitoring unit that is notified an entrance and exit of the user who is represented by the agent from the entrance and exit sensor. The planning unit, upon being notified an entrance of the user from the entrance and exit monitoring unit, obtains an evaluation result by the evaluation unit and plans an operating condition of the load device, when a result of the evaluation by the evaluation unit is the second case, such that the evaluation result of the expected utility value becomes the third case.

According to the configuration of the present invention, when there are a plurality of users in a space in which a load device is used, an advantage is obtained in that determination of an operating condition with which agreement easily reach while reflecting sense of values, such as comfort and energy saving, of each of the users.

BRIEF DESCRIPTION OF DRAWINGS

FIG. 7 is a diagram illustrating change of an expected utility value in the operation example in FIGS. 5 and 6;

FIG. 8 is a diagram illustrating change of the expected utility value in a comparative example.

DESCRIPTION OF EMBODIMENTS

General Description

Figure 1:
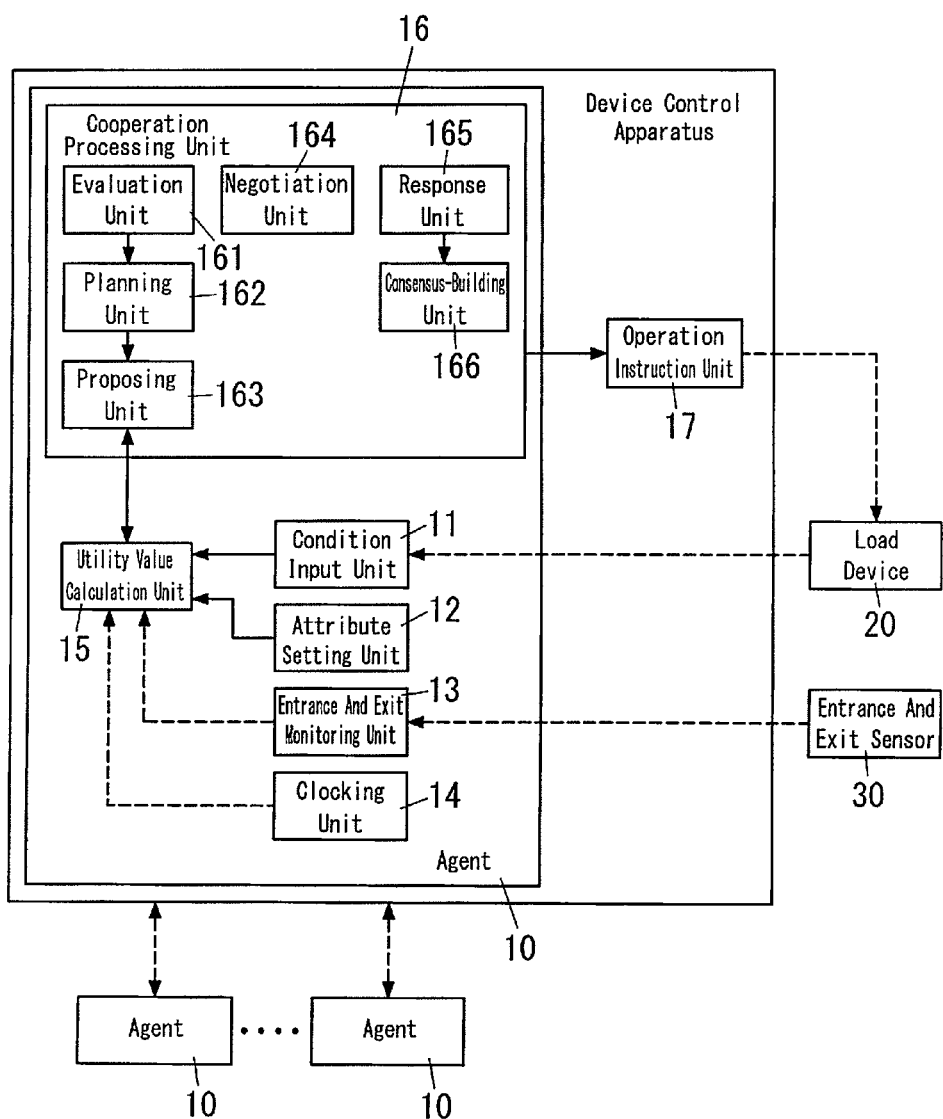
FIG. 1 is a block diagram illustrating a device control system of an embodiment.

In the following embodiment, although a case where a load device that is placed in a room of a residence is controlled will be described, the technique described below can be adopted in a space in which users are specified such as an office. Similarly, even in a commercial facility or the like, by providing authority to control the load device to specific users, the technique described below can be applied.

In the embodiment described below, a technique to perform control of a load device considering energy saving and comfort of a user will be described. That is, the following embodiment can be said to be a technique that is usable in a field of a home energy management system (HEMS) since energy management is performed by controlling an operation of the load device in a residence. Here, the load device in the following embodiment is configured such that operation is instructed by a remote controller that uses infrared or radio waves as a transmission medium, or operation is instructed by communication via a home network that is capable of wired or wireless communication.

In the following embodiment, an air conditioner is used as an example of the load device. Description will be given assuming that the air conditioner does not have a function of air-blowing cool air or warm air to a specific location of a room, and performs control such that the temperature is the same throughout the room. That is, the set temperature of the air conditioning apparatus is an air-blow temperature and the heat quantity per unit time that is provided to the room from the air conditioning apparatus can be determined by the temperature setting and the airflow. In other words, a period from a point of time when the temperature setting is changed until a point of time when the room temperature is stabilized is determined by a temperature difference between the room temperature at the time of temperature setting change and the newly set temperature and the airflow. Influence of the outside air temperature is not considered.

Data for determining the control contents of the load device include data reported by the user and data that are extracted from behavior in a daily life of the user. Thus, the data for determining the control contents of the load device can be extracted (obtained) by analyzing a record of the control contents of the load device and a record of outputs from various sensors that are provided in the residence. Although this technique is required to determine an a-priori probability value and a conditional probability value included in an influence diagram described later, a detailed description thereof will be omitted since it is not a main object of the technique described below.

The device control apparatus described below has, as a representative of each of the users who use the room in which the load device (controlled object) is placed, a function of coordinating desires of each of the users for an operation of the load device, and finally deciding the operation of the load device. This function is to represent each of the users and is hereinafter referred to as an "agent". That is, the device control apparatus includes a function of the agent. The agent is associated with the user with one-to-one correspondence, and has a function of negotiating with an agent of another user as necessary and deciding the operation of the load device.

Furthermore, since the agent is a representative of the user, an attribute of the user is set on the agent. That is, the attribute of the user with whom the agent is associated is stored in each of the agents. The attributes of the users are such as acceptability of heat and cold and sense of values regarding energy saving and may also include age or gender.

Acceptability of heat and cold can be classified into one of preferring lower temperatures (people who are sensitive to heat), preferring higher temperatures (people who are sensitive to cold), having high acceptability (neither sensitive to heat nor sensitive to cold), having low acceptability (sensitive to heat and sensitive to cold), and the like. Similarly, the sense of values to the energy saving can be classified into one of seeking comfort (energy consumption increases, in general), prioritizing energy saving (comfort decreases, in general), being moderate in both comfort and the energy saving, and the like. Note that, in the following embodiment, the acceptability to heat and cold will be used as the attribute of the user.

Due to setting the information described above in the agent, the agent estimates utility (value) for the user ("expected utility value" described later) according to the attribute of the user, and determines the operation of the load device so as to make the expected utility value as large as possible. That is, the agent functions, due to the attribute of the user being set therein, as a representative of the user having characteristics of the user. That is, the agent estimates the expected utility value for the user according to the attribute of the user who is associated with the agent, and determines the operation of the load device so as to make the expected utility value as large as possible.

The operation of the load device determined by the agent is instructed to the load device via a remote controller or a home network. That is, the device control apparatus has a function of instructing the operation to the load device (directly or indirectly). Similarly, the device control apparatus has a function of acquiring a current operating condition of the load device and transmitting it to the agent. The device control apparatus acquires the operating condition of the load device in a contactless manner with the load device using remote control signals or the like. The device control apparatus may include a configuration for acquiring the operating condition of the load device using radio waves as the transmission medium. In the embodiment described below, since a case where the load device is an air conditioner is exemplified, a temperature setting and an airflow setting will be used as the current operating condition of the load device.

The device control apparatus can be realized by executing a program in a computer that includes an interface for controlling the load device. That is, the function of the agent can be realized by an apparatus that has a function corresponding to a computer including a memory and a processor for executing a program. The interface of the device control apparatus mediates between the agent and the load device, and gives instructions from the agent to the load device. This interface is also used for acquiring the current operating condition from the load device.

That is to say, the device control apparatus includes the agent that is associated with the user who is in a space in which an environment is formed by the load device and that is realized as a representative of the user by a computer, and is configured so as to control the load device according to the operating condition of the load device determined by the agent.

The agents need to be associated with respective users. In the following embodiment, description will be given assuming that the users individually carry respective terminal devices (such as smartphone, tablet terminal, and wearable computer) that function as the device control apparatuses. That is, the terminal device that is carried by each of the users has a function as a computer and each terminal device executes a program to realize the function (function as agent) described below. The agents (terminal devices) can communicate with each other via wireless communication, and through communication between the agents, negotiation processing described later will be performed.

Figure 2:
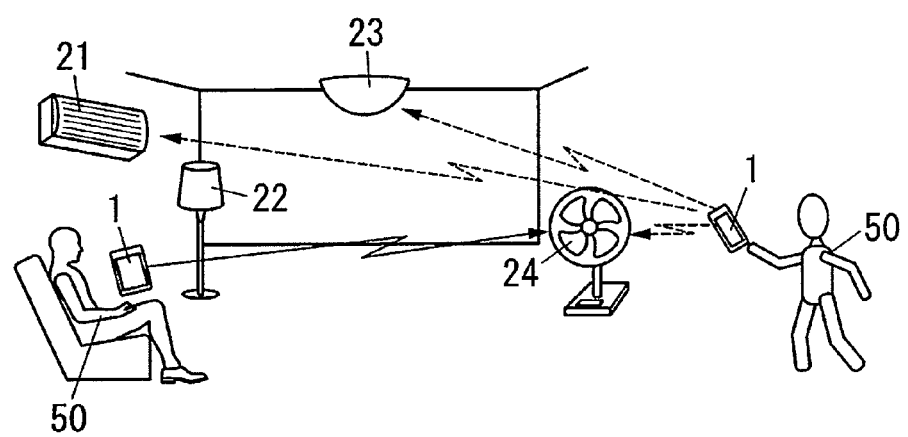
FIG. 2 is a schematic configuration diagram illustrating an exemplary usage of the device control apparatus of the embodiment.

FIG. 2 illustrates a case where the users 50 carry respective smartphones as the terminal devices 1 as an example. As the load devices, an air conditioning apparatus 21, lighting devices 22 and 23, and an electric fan 24 are shown in the diagram. In the example shown in the diagram, the function of the agent is given to each of the terminal devices 1 due to executing the program individually in each of the smartphones serving as the terminal device 1. An interface for infrared communication provided in each terminal device 1 is used as the interface for supplying instruction to the air conditioning apparatus 21, the lighting devices 22 and 23, and the electric fan 24. In the following, the air conditioning apparatus 21, the lighting devices 22 and 23, and the electric fan 24 will be described as the load devices 20 without distinguishing therebetween. Note that, in the following description, the load device 20 is the air conditioning apparatus (cooler) 21, and the room temperature is assumed to be controlled so as to be lower than that of the outdoor air temperature by the air conditioning apparatus (cooler) 21.

Note that, in a case where the users can be associated with respective agents, the plurality of agents that are associated with the plurality of users in one-to-one correspondence may be provided in one apparatus collectively. In this case, since the plurality of agents are provided in the one apparatus, data can be exchanged with each other without performing communication when the agents perform negotiation processing.

The agent needs to know whether or not the user is in the room in which the load device 20 is provided. Therefore, the device control system notifies a detection result of an entrance and exit sensor that detects entrance to and exit from the room by the user to the agent. The entrance and exit sensor can be realized by: an apparatus that is placed at a doorway of the room and recognizes the user; an apparatus that performs face recognition from images that are captured by a camera placed in the aforementioned room; or the like. A user who operates the aforementioned remote controller, which is provided with a recognition device, may be regarded as a user who is in the room, if simplified configuration is preferred. In this case, it is possible that only the agent(s) that are associated with some of the users who are in the room may be used. However, since a user who desires to change the operation of the load device operates the remote controller, all the agent(s) that are required to determine the operation of the load device are activated.

In addition, the agent has a function of, when another user enters the room in which there are already user(s), dealing with a disturbance of the room environment accompanied by participation of the new user. That is, the agent associated with the new user (person entering the room), when the new user enters the room, regards the user as being in a "transient state" from a point of time when the new user enters the room until a point of time when a predetermined settling time passes, and determines the operation of the load device so as to correspond to the transient state according to the elapsed time after the new user has entered the room. Therefore, the agent has a function of clocking the elapsed time from a point of time when the user enters the room.

Note that the agent 10 controls, when there is no other agent(s) associated with user(s) other than the user whom the agent 10 represents in the space in which an environment is formed by the load device 20 (when there is only one agent that represents a user in the space), the load device 20 so as to increase the expected utility value for the user.

(Agent)

Hereinafter, the agent will be described in more detail. The agent basically functions when there are a plurality of users in a room. That is, it is a multi-agent system in which the plurality of agents cooperate and a rule based on a model that is referred to as a "contract net" is used as the rule according to which the agents cooperate. A detail of the contract net is described in R. G. Smith: The Contract Net Protocol: High-Level Communication and Control in a Distributed Problem Solver, IEEE Transactions on Computers, Vol. C-29, No. 12, pp. 1104-1113 (1980).

As shown in FIG. 1, each agent 10 includes: a condition input unit 11 to which a current operating condition (temperature setting and airflow setting) of the load device 20 is given; and an attribute setting unit 12 in which the attribute of the user is set. In other words, the attribute setting unit 12 stores the attribute of the user with whom the agent is associated. In case of taking a new entrance to the room for determining the operation of the load device 20, the agent 10 is provided with: an entrance and exit monitoring unit 13 that is notified of entrance and exit from the entrance and exit sensor (entrance and exit detection sensor) 30 that detects entrance of the user to and exit from the room; and a clocking unit 14 that clocks an elapsed time from a point of time when the user enters the room.

In the agent 10, when the temperature setting and the airflow setting are inputted to the condition input unit 11, a utility value calculation unit 15 calculates the expected utility value indicating utility for the user using the inputted temperature setting and airflow setting and the attribute set in the attribute setting unit 12. The expected utility value is a value that quantifies the utility for the user, and is obtained with taking the current operating condition of the load device 20 and a changed operating condition of the load device 20 into consideration. The expected utility value is expressed as a numerical number and indicates that the larger the value thereof, the higher the utility for the user.

That is to say, the agent 10 includes the utility value calculation unit 15 that calculates the expected utility value indicating the utility for the user with respect to the operating condition of the load device 20 acquired from the load device 20 using the attribute of the user.

The utility value calculation unit 15 is configured to calculate, using the attribute of the user with whom the agent 10 is associated, the expected utility value indicating the utility for the user with respect to the operating condition of the load device 20 acquired from the load device 20.

In the utility value calculation unit 15, a method for calculating the expected utility value is not specifically limited as long as the expected utility value on which the sense of values of the user is reflected can be calculated. In the present embodiment, the expected utility value is calculated using conditional probabilities, by expressing relations of the conditions necessary for obtaining the expected utility value using relations of nodes in an influence diagram, as shown in FIG. 3.

Figure 3:
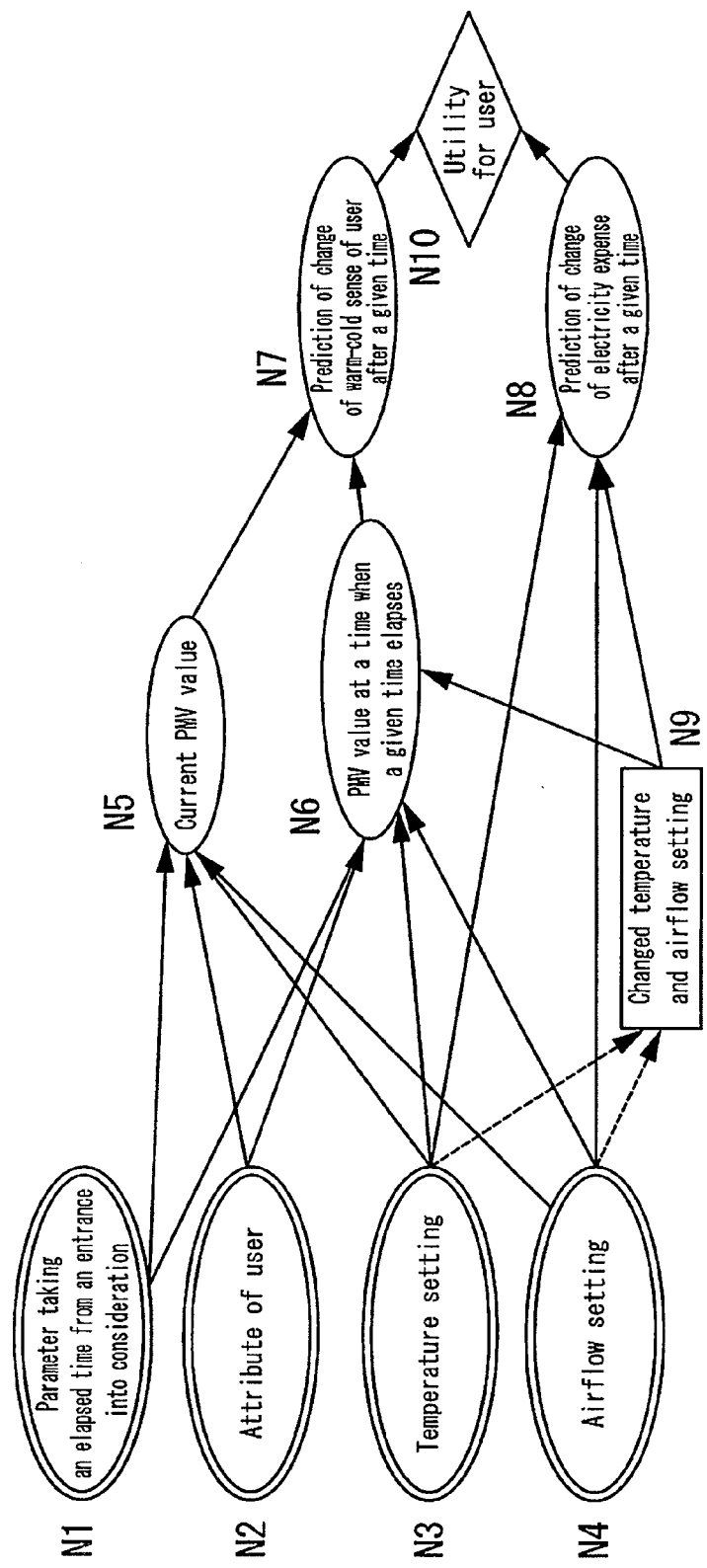
FIG. 3 is an example of an influence diagram used in the device control apparatus of the embodiment.

In an example shown in FIG. 3, the expected utility value is obtained in which a price of energy that is consumed in the load device 20 (electricity expense) and warm-cold sense (comfort) of the user are expressed as the utility (value) of the user. Here, a case where the load device 20 is an electrical device and consumed energy is electrical energy is assumed. As a general tendency, it can be said that the lower the consumed electrical energy, the greater the contribution to reducing the environmental load, and when the user tries to increase comfort, electrical energy consumption will increase. In other words, lowering the electricity expense and increasing comfort are in a trade-off relationship.

In this example, for example, the sense of values of the users can be roughly classified into: a case where the low cost of electricity expense is overemphasized (due to economical reason or environmental load); a case where comfort is overemphasized; and a case where a balance between electricity expense inexpensiveness and comfort is emphasized. In short, depending on the sense of values of the user, there are cases where high value is given to electricity expense inexpensiveness, where high value is given to increased comfort, and where high value is given to achieving a balance between electricity expense and comfort. That is, the sense of values of the user can be classified into one of, for example, "attaching importance to energy-saving", "attaching importance to comfort", "neutral", and the like. This kind of sense of values is set in the attribute setting unit 12 in advance as an attribute of the user.

Specific description will be given with reference to diagrams. In the influence diagram, as shown in FIG. 3, three kinds of nodes are used such as uncertainty nodes N1 to N8 shown by elliptical symbols, a decision node N9 shown by a square symbol, and a value node N10 shown by a rhombic symbol. These nodes N1 to N10 form a directed graph in which the nodes are linked with links shown by arrows. Points of conditional links shown by solid lines in the diagram are connected to the uncertainty nodes N1 to N8 and the value node N10, a point of a informational link shown by a broken line in the diagram is connected to the decision node N9.

The conditional link shows a relationship in which event occurrence of a child node to which the point of an arrow is connected depends on a parent node to which the base of the arrow is connected. In the conditional link, among the two nodes linked via the link, a conditional probability is given to the child node and a prior probability is given to the parent node. The informational link shows a relationship in which the state of a child node to which the point of an arrow is connected is determined based on the value of a parent node to which the base of the arrow is connected as the condition. That is, the parent node and the child node that are linked via the informational link are in a relationship that is expressed as a rule of IF (condition)-THEN (conclusion).

In FIG. 3, input parameters used for decision-making by the agent are listed side-by-side at the far left. In FIG. 3, nodes corresponding to the input parameters (nodes whose value are set from outside the diagram) are shown by respective double circles. That is, the agent calculates the expected utility value by applying the attribute set in the attribute setting unit 12, the information inputted to the condition input unit 11, and the like to the influence diagram shown in FIG. 3. In the example shown in the diagram, an elapsed time from a point of time when the entrance of the user is notified to the entrance and exit monitoring unit 13 is also used as the input parameter for calculating the expected utility value. The nodes other than the uncertainty nodes (N1 to N4) shown at the far left and the links illustrate inference processes performed internally in the agent using the input parameters and calculation processes of the expected utility value.

In the example shown in the diagram, when "attribute of user" (node N2) among the input parameters at the far left is the warm-cold sense of the user, a variance range of the node N2 is three levels such as "sensitive to heat", "average", and "sensitive to cold". The value of this node N2 is set in the attribute setting unit 12 in advance. "Temperature setting of air-conditioner" (node N3) and "airflow setting of air-conditioner" (node N4) are acquired from the air conditioner. A variance range of the node N3 is 21 to 29° C., for example, and a value of one degree step is used. A variance range of the node N4 is three levels such as "strong", "medium", and "weak". Here, the values to be given to the nodes N3 and N4 are values at the point of calculating the expected utility value (current value).

The influence diagram shown in the diagram includes two nodes N5 and N6 for obtaining PMV (Predicted Mean Vote) that is an index indicating the comfort of the user using four kinds of input parameters. At the node N5, PMV at the time of calculating the expected utility value is obtained, and at the node N6, PMV at the time when a given time elapses after changing combination of the temperature setting and the airflow setting is obtained. Change contents of the combination of the temperature setting and the airflow setting are notified from the node N9 to the node N6. A value range of PMV is seven levels of $\{-3, -2, -1, 0, +1, +2, +3\}$. PMV of 0 indicates a state in which neither hot nor cold is felt. PMV of more than 0 indicates a state in which warm (hot) is felt in the environment, and PMV of less than 0 indicates a state in which cool (cold) is felt in the environment. A value range of the node N9 is a combination of the value ranges of the nodes N3 and N4, and is $\{(21, \text{strong}), (21, \text{medium}), (21, \text{weak}), \ldots, (29, \text{weak})\}$, for example.

Incidentally, for the calculation of PMV, humidity, radiant temperature, clothing insulation, and metabolic rate are required as the parameters in addition to temperature and air speed. Here, since the object is to obtain an indication of the warm-cold sense using PMV, temperature and air speed are substituted by the temperature setting and the airflow setting of the air-conditioner, respectively, and fixed values are used for the other parameters, for simplifying the calculation. For example, the humidity is 50%, the radiant temperature is the temperature setting +0.5° C., the clothing insulation is 0.5 clo, the metabolic rate is 1.0 mets.

At the node N7, by using the current PMV obtained at the node N5 and PMV at a time when a given time elapses obtained at the node N6, the warm-cold sense of the user after the given time is predicted. A value range of the node N7 is five levels of {getting better, remaining good, remaining bad, getting worse, N/A}, for example. N/A means unpredictable. In this way, at the node N7, the change in comfort of the user after a given time is predicted and a probabilistic predictive value is outputted.

Note that, in order to deal with a case where a user who had gone out enters the room, the node N1 in which an elapsed time from an entrance is the input parameter is provided. When there is a difference between an outside air temperature and a room temperature, the user is considered to become accustomed to the room temperature with the passage of time from the entrance. Therefore, defining a state from the time of entrance to the time when the user is accustomed to the room temperature as a transient state, the elapsed time from the entrance is used as the input parameter so as to express the change of PMV in the transient state. In general, PMV is high immediately after the entrance, and PMV decreases with the passage of time. However, depending on the attribute of the user, there is a case where after PMV takes a minimum value associated with passing of time, PMV increases. Therefore, in a period of the transient state, a correction value that changes with the passage of time is added to PMV.

In any case, PMV of a user who enters the room changes in the transient state. PMV of the user who enters the room is considered to converge gradually to some value when there is no change in the room condition (the temperature setting and the airflow setting in the present embodiment). Therefore, the correction performed in the node N1 is the largest at the time of entrance of the user and the correction amount decreases gradually according to the elapsed time. Then, when a predetermined time passes from the entrance, the user is regarded to have transitioned to a "steady state". The duration of the transient state is about 80 minutes at the longest, and the correction of PMV is not performed in the node N1 considering that the user is in the steady state when about 80 minutes passes at the maximum since the entrance.

Here, a user(s) who is already in the room before the aforementioned entrance of the user is regarded as being in the steady state already, and PMV correction associated with passing of time since the aforementioned entrance of the user is not performed (correction is not performed in node N1).

Incidentally, the node N7 is a node in which a probabilistic predictive value relating to the comfort of the user is obtained, and the node N8 is a node in which a probabilistic predictive value relating to an electricity expense is obtained. The electricity expense is not directly related to the attribute of the user. On the other hand, the temperature setting and the airflow setting of the air-conditioner are parameters to determine the electricity expense. Although the outdoor air temperature or the like is also a parameter affecting the electricity expense, here, a case where the electricity expense is obtained taking only the temperature setting and the airflow setting into consideration is assumed for the sake of simplifying explanation. In other words, changing the combination of the temperature setting and the airflow setting affects the electricity expense. Therefore, the change contents of the combination of the temperature setting and the airflow setting are notified from the node N9 to the node N8, similarly to the node N6.

That is to say, in the node N8, outputs from the node N3 and N4 are used as the input parameters and a parameter given by the node N9 is also used. It is calculated whether an electricity expense at a time after a given time since the combination of the temperature setting and the airflow setting of the air-conditioner is changed "increases", "decreases", or "remains the same" as a probabilistic predictive value. In the node N8, for each of the combinations of the temperature setting and the airflow setting that are given by the node N9, how the electricity expense after the given time will change is judged in three levels of {more expensive, no change, less expensive}, in which the electricity expense when the operation is maintained at the current temperature setting and the current airflow setting is used as a reference.

In a value node N10, the expected utility value is calculated for every combination of (temperature, airflow) presented by the node N9 using the probabilistic predictive value relating to the comfort of the user obtained in the node N7 and the probabilistic predictive value relating to the electricity expense obtained in the node N8. For this calculation, for every combination of the attribute value of node N7, that is {getting better, remaining good, remaining bad, getting worse, N/A}, and the attribute value of node N8, that is {more expensive, no change, less expensive}, such as {(getting better, more expensive), (getting better, no change), . . . }, utility values are set in advance in the value node N10 for three kinds of sense of values, that is "attaching importance to comfort", "neutral", "attaching importance to energy-saving". That is, the agent of the present embodiment has three kinds of influence diagrams (same structure as that shown in FIG. 3) in which utility values for each of "attaching importance to comfort", "neutral", and "attaching importance to energy-saving" are respectively set in the value node in advance. Then, the agent, when the sense of values of the user, that is "attaching importance to comfort", "neutral", or "attaching importance to energy-saving" is notified from the user, loads the corresponding influence diagram and refers to it. Here, when the sense of values of the target user is "attaching importance to comfort", based on the utility values in the influence diagram corresponding to "attaching importance to comfort", the agent performs calculation and obtains the expected utility value using the probabilistic predictive value of the warm-cold sense obtained in the aforementioned node N7 and the probabilistic predictive value relating to the change of electricity expense obtained in node N8. Specifically, when the sense of values of the target user is "attaching importance to comfort", the agent loads the influence diagram corresponding to "attaching importance to comfort". Here, in the case where the predicted value in node N7 is "getting better" and the predicted value in node N8 is "more expensive", the expected utility value is obtained using the utility value set to the combination of (getting better, more expensive) in the node N10 in the influence diagram of "attaching importance to comfort".

The present embodiment enables the agents 10 that are associated with the respective users, due to being given judgment function based on the sense of values described above, to evaluate the operating condition of the load device 20 based on the sense of values and to confer when the evaluation results differ.

(Conference)

When there are a plurality of users in the room, evaluation results of the expected utility values that are each calculated by the utility value calculation unit 15 of the agent 10 associated with each of the users possibly conflict with each other, and due to the conflict, the operating condition to be instructed to the load device 20 cannot be uniquely determined. The conflict among evaluation results of the expected utility values calculated by different agents 10 may happen when any of the agents 10 tries to change the operation of the load device 20.

In the case where there is an agent 10 whose expected utility value decreases when the operation of the load device 20 is changed, the agent 10 requests conference with the agent 10 that has tried to change the operation of the load device 20. When an agent 10 that requests conference appears, in order to determine the operation of the load device 20, negotiation processing described below is performed and cooperation processing is performed such that an agreement can be reached among the agents 10 associated with respective users.

Here, the agent 10 that requests conference and the agent 10 that deals with the requested conference perform different kinds of processing. That is, the agent 10 associated with each of the users can perform processing for requesting conference and processing for dealing with the requested conference, and one of the two kinds of processing is initiated as necessary. Hereinafter, the agent 10 in which the former processing for requesting conference is initiated is referred to as a "contractor", and the agent 10 in which the latter processing for dealing with the requested conference is initiated is referred to as a "manager".

The manager (agent 10) proposes to change the operation of the load device 20 to the other agent(s) 10. The agent 10 that does not accept the operation of the load device 20 proposed by the manager is designated as a contractor (agent 10) by the manager, since the agent 10 has requested conference with respect to the proposal from the manager. Respective processing performed by the manager and the contractor will be described later.

When any of the agents 10 becomes the manager and another agent 10 becomes the contractor, all the agents 10 that are associated with respective users that use the same load device 20 individually acquire the operating condition of the load device 20 at regular intervals of given times. The time interval at which the agent 10 acquires the operating condition from the load device 20 is 5 minutes, for example.

That is to say, the agent 10 includes a cooperation processing unit 16 that negotiates with an agent 10 that has calculated a conflicting expected utility value and uniquely determines the operating condition that is to be instructed to the load device 20.

Figure 4:
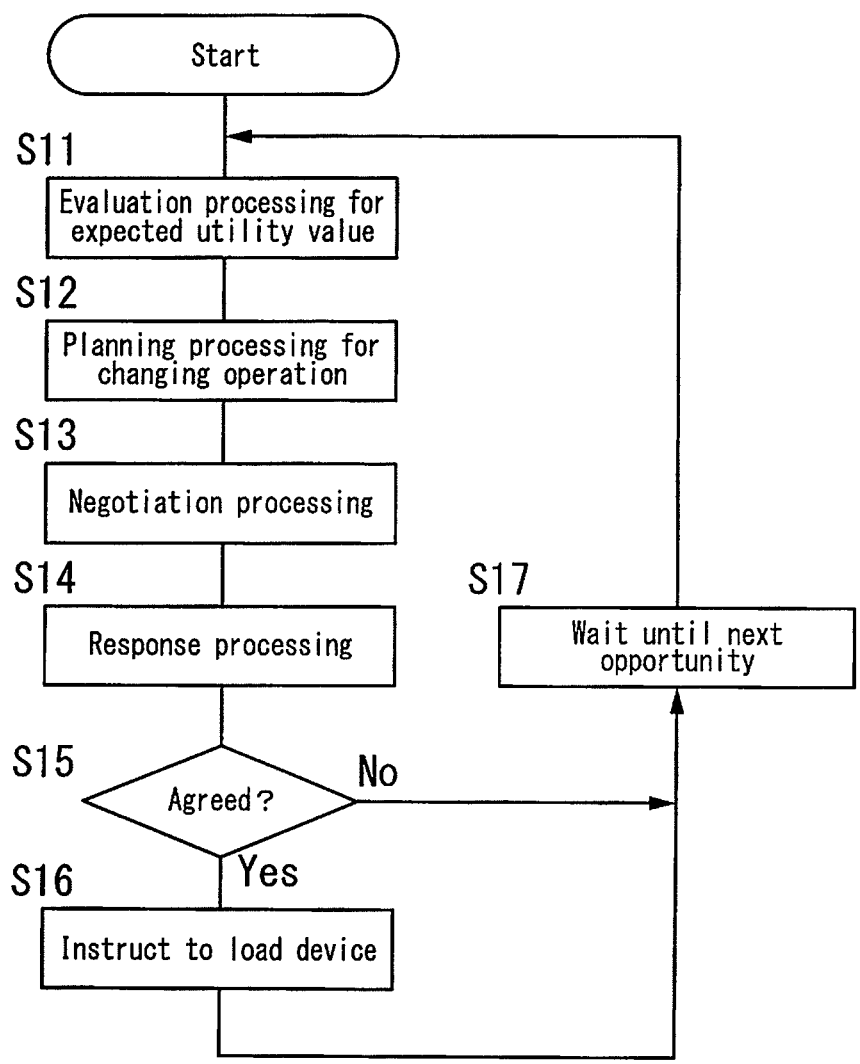
FIG. 4 is an explanatory diagram illustrating an operation of a cooperation processing unit in the device control apparatus of the embodiment.

The cooperation processing unit 16 determines the operation of the load device 20 by performing four kinds of processing described later. That is, the cooperation processing unit 16 performs, as shown in FIG. 4, (1) evaluation processing (S11) for the expected utility value, (2) planning processing (S12) relating to the change of the operation of the load device 20, (3) negotiation processing (S13) with other agent(s), and (4) response processing (S14) to another agent. Hereinafter, the respective processing will be described specifically. In FIG. 4, as an operation of the agent 10, when an agreement is reached between the agents 10 (S15: yes) as a result of performing the negotiation processing in step S13, processing (S16) for instructing agreed operation to the load device 20 is also described. Note that, when an agreement is not reached in step S15 (S15: no), the current operation of the load device 20 is maintained until the next opportunity (S17).

That is to say, the agent 10 includes the cooperation processing unit 16 that judges whether the operating condition of the load device 20 is acceptable or not to the user by evaluating the expected utility value obtained for the user, the judgment being performed in each of the agents associated with respective users when there are a plurality of users in a space, and uniquely determines the operating condition that is to be instructed to the load device 20 if there is a user to whom the operating condition is not acceptable.

The cooperation processing unit 16 is configured to judge whether the operating condition of the load device 20 is acceptable or not to the user with whom the agent is associated by evaluating the expected utility value obtained for the user. Then, in a case where there is a plurality of agents 10 with which a plurality of users are respectively associated, if there is a user to whom the operating condition of the load device 20 is not acceptable, the cooperation processing unit 16 is configured to determine uniquely, among the plurality of agents 10, the operating condition that is to be instructed to the load device 20.

The cooperation processing unit 16 is initiated when there is a user with whom the agent 10 is associated in an environment and a new user enters this environment. That is, the cooperation processing unit 16 is initiated when a new agent 10 participates in an environment in which existing agent(s) 10 are in cooperation. Not only in the case where a new agent 10 participates, but also in the case where there are a plurality of agents 10 in an environment and an agreement about the operating condition of the load device 20 has been reached among the plurality of agents 10, the cooperation processing unit 16 is initiated at appropriate time intervals so as to re-examine the operating condition of the load device 20. That is, the cooperation processing unit 16 of each of the agents 10 calculates the expected utility value at predetermined time intervals and performs processing for comparing it with a judgment threshold and processing for changing the operating condition of the load device 20 as necessary.

(1) Evaluation Processing

The evaluation processing is processing in which the expected utility value of the current operation of the load device 20 is evaluated, the expected utility value being calculated by the utility value calculation unit 15 of the agent 10 using the temperature setting and the airflow setting that are received from the condition input unit 11. The processing for evaluating the expected utility value is performed by an evaluation unit 161 provided in the cooperation processing unit 16. That is, since the expected utility value expresses utility for the user, the evaluation unit 161 performs evaluation (judgment) in which the expected utility value is classified into one of three levels of, for example, "desirable (first case)", "undesirable (second case)", and "neither desirable nor undesirable (third case)". Specifically, two levels of judgment thresholds (first judgment threshold, second judgment threshold (<first judgment threshold)) for the expected utility value are set in the evaluation unit 161, and by comparing the expected utility value with the judgment thresholds, classification into one of the three levels described above is performed. For example, the evaluation unit 161 judges "desirable (first case)" if the obtained expected utility value is larger than the first judgment threshold. The evaluation unit 161 judges "neither desirable nor undesirable (third case)" if the obtained expected utility value is the first judgment threshold or less and greater than the second judgment threshold. The evaluation unit 161 judges "undesirable (second case)" if the obtained expected utility value is the second judgment threshold or less.

That is to say, the cooperation processing unit 16 of the agent 10 includes an evaluation unit 161 that classifies the expected utility value into one of at least three levels of the first case that is desirable for the user, the second case that is undesirable for the user, and the third case that is neither desirable nor undesirable for the user by comparing the expected utility value with the judgment thresholds.

The evaluation unit 161 is configured to classify the operating condition of the load device 20 into one of at least three levels of the first case that is desirable for the user with whom the agent 10 is associated, the second case that is undesirable for the user, and the third case that is neither desirable nor undesirable for the user by comparing the expected utility value with the judgment thresholds.

Hereinafter, in the classification result of the expected utility value, a case of "desirable" (first case) is referred to as "G", a case of "neither desirable nor undesirable" (third case) is referred to as "Y", and a case of "undesirable" (second case) is referred to as "R". In other words, if the output of the evaluation unit 161 is "G" or "Y", the expected utility value with respect to the current operation of the load device 20 is in a tolerable (bearable) range for the user. If the output of the evaluation unit 161 is "R", the expected utility value with respect to the current operation of the load device 20 is in an intolerable (unbearable) range for the user.

(2) Planning Processing

The planning processing is processing for planning a tolerable operating condition of the load device 20, when the evaluation result of the expected utility value by the evaluation unit 161 is "R". The processing for planning an operating condition of the load device 20 is performed by a planning unit 162 provided to the cooperation processing unit 16. The planning unit 162 plans an operating condition for increasing the expected utility value from the value with respect to the current operating condition of the load device 20.

Since the sense of values of the user with respect to the operating condition of the load device 20 is reflected in the expected utility value calculated by the utility value calculation unit 15, when the expected utility value is low, the planning unit 162 plans an operating condition to which the current operating condition of the load device 20 can be changed so as to increase utility for the user. The planned operating condition is selected such that the output of the evaluation unit 161 becomes "Y" or "G". The planning unit 162 selects, when there are a plurality of selectable operating conditions, an operating condition for which the increase of the expected utility value is the minimum (that is, to become "Y" closest to "R"). The changeable range of the operation of the load device 20 is, for example, limited to ±2° C. for the temperature setting. No limitation is provided to the airflow setting, as long as it is in the allowable range of the operation of the load device 20.

That is to say, the cooperation processing unit 16 of the agent 10 includes the planning unit 162 that plans an operating condition of the load device 20 such that, when the evaluation result by the evaluation unit 161 is the second case, the evaluation result of the expected utility value becomes the third case.

(3) Negotiation Processing

The agent 10 whose planning unit 162 plans an operating condition of the load device 20 approaches the other agent(s) 10 about the planned operating condition. In the following description, in order to distinguish the state of the agent 10, numerals 0 to 4 are added to the end of the reference sign "10" that represents the agent. That is, one of reference signs of "100", "101", "102", "103", and "104" is given to each of the agents 10 as appropriate depending on the state of the agent. In the following, the reference sign "100" is given to the agent that planned the operating condition and the reference sign "101" is given to (each) agent that is not the agent that planned the operating condition.

The cooperation processing unit 16 of each of the agents 10 includes a proposing unit 163 that shows the operating condition of the load device 20 planned by the planning unit 162 to the other agent(s) 10. The proposing unit 163 of the agent 100 whose planning unit 162 planned the operating condition proposes the change of the operating condition of the load device 20 to the other agent(s) 101.

That is to say, the cooperation processing unit 16 of the agent 10 includes the proposing unit 163 that proposes an operating condition of the load device 20 planned by the planning unit 162 to the agent(s) 10 that are representative(s) of the other user(s) (associated with the other user(s)).

As described later, each of the other agent(s) 101 performs response processing in which acceptance or refusal is determined for the operating condition of the load device 20 proposed by the agent 100, and a reply is sent requesting negotiation when the proposal is not acceptable. On the other hand, the proposing unit 163 of the agent 100 whose planning unit 162 planned the operating condition receives, after the proposal of the change of the operating condition of the load device 20, acceptance or refusal for the proposed operating condition from each of the other agent(s) 101.

The proposing unit 163 instructs, when all the other agent(s) 101 have accepted the proposal (when having not received a reply of refusal from the other agent(s) 100 within a predetermined period), the change of the operation to the load device 20 via an operation instruction unit 17 that is an interface provided to the device control apparatus so as to change the operation of the load device 20 to the proposed condition.

On the other hand, the proposing unit 163 notifies, when any of the other agent(s) 101 refuse the proposal (when having received reply of refusal from any of the other agent(s) 100 in the predetermined period), a negotiation unit 164 provided to the cooperation processing unit 16 of the agent 102 that has refused the proposal (reference sign "102" is given to the agent that has refused the proposal by the agent 100). The negotiation unit 164 of the agent 100 sets all the agents 102 as negotiation partners regardless of the number of the agents 102 being one or more, when the agents 102 that have refused the proposal are notified from the proposing unit 163.

When the negotiation unit 164 determines the negotiation partner, the negotiation unit 164 sets the proposal side agent 100 (here, the agent itself) as an aforementioned "manager" and designates the agent 102 that is the negotiation partner as a "contractor". When there are a plurality of agents 102 that have refused the proposal, all of them are designated as contractors for negotiation. That is, the manager and the contractors negotiate one-to-one or, in some cases, one-to-many such that the conflict is resolved so as to reach an agreement. When an agreement has been reached, as shown in step S16 in FIG. 4, the operation on which the agreement has been reached is instructed to the load device 20. Since there is a case where an agreement has not been reached, when the agreement has not been reached, as shown in step S17 in FIG. 4, the current operation of the load device 20 is maintained and the agent 10 is on standby until the next opportunity, that is, a point of time when evaluation processing for an expected utility value is next performed (that is, next setting change time of the load device).

That is to say, the cooperation processing unit 16 of the agent 10 includes the negotiation unit 164 that, when a response refusing the proposal has been received from a response unit 165 (described later), designates the agent itself as a manager and the agent that has refused the proposal as a contractor and negotiates so that the evaluation result of the expected utility values in each of the manager and the contractor becomes the first case or the third case.

The negotiation unit 164 is configured such that, when a response refusing the proposal has been received from the response unit 165 of the agent 10 that is associated with the other user, the agent itself is set as a manager, the agent 10 that has refused the proposal is set as a contractor, and negotiation is performed so that the evaluation result of the expected utility values in each of the manager and the contractor becomes the first case or the third case.

Note that, when there is a plurality of the agents 10 whose evaluation results of the current respective expected utility values are "R" (when there is a plurality of the agents 10 that are candidates for the manager), the expected utility values may be exchanged among the agents 10 that are the candidates, and the agent 10 that has the smallest value thereof may be the manager at the time.

(4) Response Processing

Since the agent 10 whose evaluation unit 161 has outputted "G" or "Y" in the evaluation processing (1) does not become a manager, functions of the planning unit 162, the proposing unit 163, and the negotiation unit 164 are not used, and a proposal from another agent 10 is waited for. In this agent 10, upon receiving a proposal from another agent 10 (agent 100 that has planned an operating condition), the response unit 165 provided in the cooperation processing unit 16 is activated, and the response unit 165 causes the utility value calculation unit 15 to calculate the expected utility value with respect to the contents of the proposal. If the evaluation result by the evaluation unit 161 for this expected utility value is "G" or "Y", the response unit 165 sends a reply of permission to the agent 100 that has sent the proposal. On the other hand, if the evaluation result by the evaluation unit 161 for this expected utility value is "R", the response unit 165 sends a reply of refusal to the agent 100 that has sent the proposal.

That is to say, the cooperation processing unit 16 of the agent 10 includes the response unit 165 that returns a reply of refusal to the proposer, if the evaluation result by the evaluation unit 161 for the operating condition of the load device 20 proposed by the proposing unit 163 is the second case.

The response unit 165 is configured to return a reply of refusal to the proposed agent 10, if the evaluation result, by the evaluation unit 161 (of the agent itself) for the operating condition of the load device 20 proposed by the proposing unit 163 of the agent 10 that is associated with another user, is the second case.

The response unit 165 notifies, when making a reply of refusal to the agent 100 that has sent the proposed contents, the expected utility value will decrease, that is, the evaluation result thereof will become "R". Since the agent 100 that has sent the proposed contents becomes a manager upon receiving a response refusing the proposal, the agent 100 designates another agent 102 that has returned the reply of refusal as a contractor, as described above.

In another agent 102 that has been designated as the contractor, a consensus-building unit 166 provided in the cooperation processing unit 16 is activated. The consensus-building unit 166 of the contractor negotiates with the negotiation unit 164 in the agent 100 of the manager, and adjusts the operation of the load device 20 such that the evaluation result of the expected utility value becomes "Y" or "G" in each of the manager and the contractor.

That is to say, the cooperation processing unit 16 of the agent 10 includes the consensus-building unit 166 that, when the agent 10 becomes a contractor, negotiates with the negotiation unit 164 of the manager such that the evaluation result of the expected utility value in each of the agents 10 that have become the manager and the contractor is the first case or the third case.

The consensus-building unit 166 of the contractor adjusts the operation of the load device 20 such that the conflict with the manager will be dissolved based on a cooperation strategy described below. That is, since the evaluation unit 161 has judged that the evaluation result is "R" by comparing the expected utility value with the judgment threshold (second judgment threshold), the evaluation result can be changed if one of the expected utility value and the judgment threshold is changed. However, the change of the expected utility value requires a change of the processing performed by the utility value calculation unit 15, and it is preferable to avoid changing the processing performed by the utility value calculation unit 15 when designated as the contractor. Therefore, the consensus-building unit 166 adopts a strategy of changing the judgment threshold of the evaluation unit 161 in order to resolve the conflict with the manager.

That is to say, the consensus-building unit 166 of the contractor changes the judgment threshold (second judgment threshold) with which the expected utility value is compared so as to make the classification between "R" and "Y" in the evaluation unit 161 to be judged "Y" more (direction of increasing the range of being judged "Y"). That is, the consensus-building unit 166 of the contractor changes the judgment threshold used in the evaluation unit 161 so as to improve an evaluation result of the expected utility value. The amount of the change of the judgment threshold is determined in advance. That is, the consensus-building unit 166 of the contractor decreases the second judgment threshold by a predetermined value so as to result in a higher evaluation result of the expected utility value. After the consensus-building unit 166 changes the judgment threshold, the evaluation unit 161 compares the same expected utility value with the changed judgment threshold. The consensus-building unit 166 judges that the conflict is resolved if the evaluation result is not "R" and returns a reply of permitting the operation of the load device 20 proposed by the manager to the agent 100 of the manager. However, at this time, the permission is returned with a condition of "until the time of the next expected utility evaluation". That is, the consensus-building unit 166 restores the judgment threshold that has been decreased (so as to increase the range of being judged "Y") to the original value at the time of the next expected utility evaluation. In other words, the agent 10 that has become a contractor limits the period in which the judgment threshold is changed so as to result in a higher evaluation result of the expected utility value until the time when the expected utility value is next evaluated, and restores the changed judgment threshold to the original judgment threshold when the next evaluation time arrives.

On the other hand, in a case where the evaluation result by the evaluation unit 161 has not been changed by the judgment threshold being changed once, the consensus-building unit 166 changes the judgment threshold again, and obtains the evaluation result using the judgment threshold that has been changed again. At this time, if the evaluation result by the evaluation unit 161 is not "R", a reply of permitting the operation of the load device 20 proposed by the manager is returned, as described above, with the condition of "until the time of the next expected utility evaluation". Note that, in the present embodiment, an upper limit is given to the number of times the judgment threshold is changed. The upper limit of the number of changes is, for example, about 2 to 3, depending on the size of the change whereby the judgment threshold is changed.

That is to say, the agent 10 that has become a contractor resolves the conflict with the manager by making a concession with respect to the proposal made by the manager in a range acceptable to the agent itself.

When the aforementioned processing has been performed, there is a case where the conflict between the manager and the contractor is not resolved. When the conflict is not resolved (for example, even if the contractor has changed the judgment threshold the maximum number of times, if the evaluation result by the evaluation unit 161 of the contractor is still "R", the conflict is not resolved), the operation proposed by the manager is handled as invalid and the current operation of the load device 20 is maintained.

(5) Right Restoration Processing

Incidentally, in the aforementioned operation, the agent 102 that was designated as a contractor has changed the judgment threshold to the expected utility value that is derived from the operation of the load device 20 proposed by the agent 100 being the manager. Therefore, the contractor has made a "concession" to avoid the conflict with respect to the proposal by the manager. However, if the contractor makes a concession one-sidedly, the user corresponding to the agent 102 that was designated as the contractor may have a sense of unfairness due to lengthening a period in which "patience" is forced.

That is to say, when the operation of the load device 20 is changed due to the judgment threshold being changed as the result of the contractor making a concession to the manager, the expected utility value of the agent 102 that has become the contractor is decreased. Then, the agent 102 that has become the contractor (cooperation processing unit 16 of the agent 102) performs right restoration processing described below, when the evaluation result of the agent 100 that has become the manager becomes "Y" or "G" and the evaluation result is "Y" or "G" in each of the agents 10 that are in the room. In the present embodiment, the right restoration processing can be initiated when the evaluation result by the evaluation unit 161 is not "R" in each of the agents 10 that are in the room.

The condition of the agent 10 that can initiate the right restoration processing is that the agent 10 has become a contractor and has changed the judgment threshold in the past. Therefore, the cooperation processing unit 16 of the agent 10 stores (holds) the number of times the judgment threshold has been changed as a number of concessions. The number of concessions, which is a number of times the judgment threshold has been changed, is saved as an accumulated value. That is, the agent 10 increments the number of concessions stored in the agent 10 by 1 every time the agent 10 changes the judgment threshold. Then, the cooperation processing unit 16 of the agent 10 decrements the number of concessions by 1 every time the agent 10 succeeds in the right restoration processing.

When a plurality of the agents 10 that are in the room satisfy the aforementioned condition to initiate the right restoration processing, the numbers of times the judgment threshold has been changed in respective agents (that is the number of concessions) are evaluated, and the agent 10 who has the largest number of concessions performs the right restoration processing. It is considered that the larger the number of concessions, the larger the difference from the initial judgment threshold, which is the value before the changes, and the greater the degree of "patience" of the user.

The agent 10 improves the expected utility value by a prescribed value in the right restoration processing. That is, in the right restoration processing, the planning unit 162 of the agent 10 plans an operation of the load device 20 so as to improve the expected utility value by one step (prescribed value). Hereinafter, the agent that performs the right restoration processing is given a reference sign "103" and the other agent(s) that are not the agent that performs the right restoration processing are given reference sign(s) "104". The operation of the load device 20 planned by the planning unit 162 of the agent 103 is proposed from the proposing unit 163 of the agent 103 to the other agent(s) 104 including the agent 100 that was the manager. The proposing unit 163 of the agent 103 receives acceptance or refusal to the proposal from the other agent(s) 104.

The proposing unit 163 of the agent 103 instructs, when all the other agent(s) 104 accept the proposal, the operation to the load device 20 via the operation instruction unit 17. That is, the agent 103 that has performed the right restoration processing causes, when all the other agent(s) 104 accept the proposal, the load device 20 to execute the operation planned in the right restoration processing. On the other hand, the proposing unit 163 of the agent 103 terminates the right restoration processing if any of the other agent(s) 104 refuses the proposal. That is, the proposal by the agent 103 made in the right restoration processing is withdrawn.

The agent 103 that has performed the right restoration processing as described above decrements the number of concessions by 1 when the right restoration processing is successful. Success in the right restoration processing means the case where the proposal is accepted by all the other agent(s) 104 and the planned operation of the load device 20 is instructed.

That is to say, after the evaluation result of the expected utility value becomes the first case or the third case in each of the manager and the contractor, the agent 10 that has been the contractor and that has the number of concessions of not 0 (i.e., has the number of concessions of 1 or more), proposes an operating condition of the load device 20 that improves the expected utility value to the other agent(s) 10, and if the result of the evaluation of the expected utility value obtained in each of the other agent(s) 10 with respect to the proposed operating condition is the first case or the third case, the cooperation processing unit 16 decrements the number of concessions.

An example of the operation when the right restoration processing is successful will be illustrated. For example, in a case where the number of concessions is 5 times (accumulated value), when the right restoration processing is successful, the accumulated value of the number of concessions is changed to 4 times.

Note that, as another configuration, when the agent 10 has performed the right restoration processing, the accumulated value of the number of concessions may be decremented by 1 regardless of the success or failure in the right restoration processing.

Operation Example

Hereinafter, the aforementioned operation of the agent 10 will be described using a specific case example. In the following, description will be given where, in a scene in which the load device 20 is an air conditioner and performing cooling in a room, there are two users (first user, second user) in the room, and another user (third user) enters the room after returning from going out. The users who are already in the room (first user and second user) are referred to as "persons already in the room" and the user who enters the room (third user) is referred to as "person entering the room". The attribute of the person entering the room (third user) is "sensitive to heat" and "attaching importance to comfort", the attribute of one of the persons already in the room (first user) is "average" and "neutral", and the attribute of the other of the persons already in the room (second user) is "sensitive to cold" and "attaching importance to energy-saving". Hereinafter, the operating condition of the load device 20 that includes the temperature setting and the airflow setting is described in a form of: (temperature setting, airflow setting).

In this example, there are three users, the agent 10 is activated in each of the users, and the operation of the load device 20 is thereby determined by the three agents 10. Hereinafter, in order to distinguish the agents of the persons already in the room and the agent of the person entering the room, the agents of the persons already in the room are given reference signs "10A" and the agent of the person entering the room is given a reference sign "10B". Similarly, when the agents 10A of the two persons already in the room need to be distinguished, the agent of one of the persons already in the room (first user) is given a reference sign "10A1" and the agent of the other of the persons already in the room (second user) is given a reference sign "10A2". The operating condition of the load device 20 is assumed to be (28° C., medium) when the person entering the room enters the room, and each of the persons already in the room is assumed to be in a steady state. Being in the steady state, each of the agents 10A corresponding to the persons already in the room is monitoring the change of the operation of the load device 20, and does not control the load device 20 as long as there is no change in the operation of the load device 20. On the other hand, the agent 10B of the person entering the room is activated by the entrance being notified by the entrance and exit sensor 30, and then acquires the operating condition of the load device 20 (28° C., medium) at the time of the entrance from the load device 20.

The agent 10B of the person entering the room obtains the evaluation result of the expected utility value for the user at a given time T later in a case where the operating condition is maintained in the load device 20. Here, since the attribute of the person entering the room is "sensitive to heat" and "attaching importance to comfort", the agent 10B of the person entering the room is assumed to have judged the room environment at the time of entrance to be "R". Obviously, even if the room environment at the time of entrance is the same, if the attribute of the person entering the room is different (such as "average" and "neutral", or "sensitive to cold" and "attaching importance to energy-saving"), the agent 10 may have judged to be "G" or "Y".

The agent 10B of the person entering the room becomes a manager, since the evaluation result by the evaluation unit 161 is "R", and tries to change the operating condition of the load device 20. Note that the planned operating condition for changing the current operating condition is not an operating condition that makes an evaluation result by the evaluation unit 161 be "G", but is an operating condition that makes an evaluation result be "Y". This operating condition is extracted by the agent 10B of the person entering the room using the aforementioned influence diagram (refer to FIG. 3, for example). By this processing, an operating condition such as (26° C., strong), for example, is extracted. That is, an operating condition to be proposed to the other agents 101 (agents 10A1 and 10A2 of persons already in the room) is planned in the planning unit 162. And then, the agent 10B of the person entering the room proposes the operating condition planned by the planning unit 162 to the agents 10A1 and 10A2 of the persons already in the room via the proposing unit 163.

The agent 10A of the person already in the room that has received the proposal from the agent 10B of the person entering the room evaluates the contents of the proposal in the evaluation unit 161. When the evaluation result by the evaluation unit 161 is either "G" or "Y" and not "R", the response unit 165 of the agent 10A of the person already in the room makes a reply of permission to the agent 10B of the person entering the room. For example, the agent 10A1 of the person already in the room whose attribute is "average" and "neutral" judges the condition to be in an acceptable range if the current operating condition of the load device 20 (28° C., medium) is changed to the operating condition of (26° C., strong) proposed by the agent 10B of the person entering the room. In this case, the agent 10A1 of the person already in the room returns a response accepting the proposal to the agent 10B of the person entering the room.

On the other hand, if the evaluation result by the evaluation unit 161 is "R" in the agent 10A of the person already in the room that has received the proposal from the agent 10B of the person entering the room, the response unit 165 of the agent 10A of the person already in the room returns a reply of refusal to the agent 10B of the person entering the room. For example, the agent 10A2 of the person already in the room whose attribute is "sensitive to cold" and "attaching importance to energy-saving" judges the condition to be out of an acceptable range if the current operating condition of the load device 20 (28° C., medium) is changed to the operating condition of (26° C., strong) proposed by the agent 10B of the person entering the room. In this case, the agent 10A2 of the person already in the room returns a reply of refusal to the agent 10B of the person entering the room.

The agent 10A2 that has thus refused the proposal is designated as a contractor by the agent 10B, which acts as the manager, of the person entering the room. The agent 10A2 that has been designated as the contractor recognizes the conflict with the agent 10B as the manager. The agent 10A2 as a contractor activates the consensus-building unit 166 to change the judgment threshold (to change the second judgment threshold) that is used to compare with the expected utility value in the evaluation unit 161, in order to resolve the conflict with the agent 10B as a manager. After the judgment threshold is changed, the expected utility value is again compared in the evaluation unit 161. Assuming that the evaluation result in the evaluation unit 161 has changed from "R" to "Y" due to the change of the judgment threshold, the agent 10A2 returns a reply of acceptance with a condition of "until the time of the next expected utility evaluation" to the agent 10B of the person entering the room via the response unit 165.

Due to the operation described above, since the agent 10B of the person entering the room receives acceptance from both the agents 10A1 and 10A2 of the persons already in the room, the agent 10B instructs the proposed operating condition to the load device 20 via the operation instruction unit 17.

At a point of time when a given time T has passed since the operating condition of the load device 20 is changed, although the operating condition of the load device 20 is (26° C., strong), the evaluation unit 161 of the agent 10B of the person entering the room again judges the evaluation result as "R" with respect to continuation of this operating condition. This kind of case may happen when the indoor environment is not responding due to thermal inertia or the like despite the operating condition of the load device 20 having been changed. However, since the temperature information given to the agent 10B of the person entering the room is only the temperature setting of the load device 20 and the agent 10B of the person entering the room cannot detect the influence of thermal inertia, the influence of thermal inertia is factored into a correction value that reflects the elapsed time from the entrance on PMV. The agent 10B of the person entering the room again acts as a manager since the evaluation result of the evaluation unit 161 is "R".

The proposing unit 163 of the agent 10B of the person entering the room again extracts an operating condition that changes the evaluation result of the evaluation unit 161 to "Y" and sends the operating condition to the agents 10A1 and 10A2 of the persons already in the room. The operating condition to be proposed is a condition of (25° C., medium), for example. The agent 10A of the person already in the room makes a reply of accepting the proposal from the agent 10B being the manager, as long as the evaluation result in the evaluation unit 161 with respect to the proposed operating condition is not "R", even though the expected utility value is decreased. For example, the agent 10A1 of the person already in the room whose attribute is "average" and "neutral" makes a reply of accepting the proposal from the agent 10B being the manager.

On the other hand, in the agent 10A2 of the person already in the room whose attribute is "sensitive to cold" and "attaching importance to energy-saving", the evaluation result of the expected utility value in the evaluation unit 161 with respect to the proposed operating condition is considered to be "R". And then, due to making a reply of refusal, the agent 10A2 is designated as a contractor, and accordingly, the agent 10A2 changes the evaluation result in the evaluation unit 161 to "G" or "Y" so as to cooperate with the manager by changing the judgment threshold used in the evaluation unit 161 and makes a reply of permitting the proposed operating condition with a condition of "until the time of the next expected utility evaluation".

Therefore, the agent 10B of the person entering the room as the manager receives replies of acceptance to the proposal from both the other agents 10A1 and 10A2 and is able to instruct the operating condition of (25° C., medium), which has been proposed with respect to the load device 20, to the load device 20 via the operation instruction unit 17.

Thereafter, at a point of time when the given time T has passed again (that is, when a period of 2T has passed since the entrance), the operating condition of the load device 20 is a condition of (25° C., medium). If the evaluation result by the agent 10B of the person entering the room is "R" even at this point of time, the agent 10B of the person entering the room plans a condition of (24° C., weak), for example, as the new operating condition and proposes the condition to the agents 10A1 and 10A2 of the persons already in the room. The agents 10A1 and 10A2 of the persons already in the room repeat the aforementioned operation for the proposal, and eventually, the operating condition proposed by the agent 10B of the person entering the room is instructed to the load device 20.

Assuming that at a point of time when the given time T has passed thereafter (that is, when a period of 3T has passed since the entrance), the evaluation result of the operating condition by the agent 10B of the person entering the room has become "Y", a subsequent proposal is not made. At this time, if the evaluation result in the agent 10A1 having the attribute of "average" and "neutral" among the agents 10A of the persons already in the room is "G" and the evaluation result in the agent 10A2 having the attribute of "sensitive to cold" and "attaching importance to energy-saving" is "Y", the evaluation result will no longer be "R" in any of the agents 10A1, 10A2, and 10B. That is, an agreement has been reached with respect to the operating condition of the load device 20.

At this point of time, since the evaluation result of the expected utility value is not "R" in each of the agents 10A1, 10A2, and 10B, the agent 10A of the person already in the room can initiate right restoration processing. In the following, a case is considered where the right restoration processing is initiated in the agent 10A2 having the attribute of "sensitive to cold" and "attaching importance to energy-saving"

At the point of time when a period of 3T has passed since the entrance, the operating condition of the load device 20 is a condition of (24° C., weak). The agent 10A2 having the attribute of "sensitive to cold" and "attaching importance to energy-saving" proposes, when the right restoration processing is initiated, a condition of (25° C., medium), for example, as an operating condition of the load device 20 to increase the expected utility value of the agent itself by one step. Here, if the agent 10B having the attribute of "sensitive to heat" and "attaching importance to comfort" returns an evaluation result of "R" for this proposal, the agent 10A2 having the attribute of "sensitive to cold" and "attaching importance to energy-saving" fails in the right restoration processing, and as a result the operating condition of the load device 20 is maintained at the condition of (24° C., weak).

At a point of time when a period of 4T has passed since the entrance, the operating condition of the load device 20 will have been maintained at the condition of (24° C., weak). At this point of time, if the evaluation result of the expected utility value with respect to the operation of the load device 20 is not "R" in any of the agents 10A1, 10A2, and 10B, the agent 10A2 having the attribute of "sensitive to cold" and "attaching importance to energy-saving" again initiates the right restoration processing. That is, the agent 10A2 having the attribute of "sensitive to cold" and "attaching importance to energy-saving" proposes a condition of (25° C., medium), for example, as the operating condition of the load device 20. Here, in response to the proposal from the agent 10A2 in the right restoration processing, it is assumed that the evaluation result of the expected utility value in the agent 10B having the attribute of "sensitive to heat" and "attaching importance to comfort" is "G" due to passing of time since the entrance and the evaluation result of the expected utility value in the agent 10A1 having the attribute of "average" and "neutral" is "G". In this case, since the evaluation result is not "R" in any of the agents 10A1, 10A2, and 10B, the proposal of the agent 10A2 is accepted. Then, the agent 10A2 having the attribute of "sensitive to cold" and "attaching importance to energy-saving" instructs the operating condition of (25° C., medium) to the load device 20.

At a point of time when a period of 5T has passed since the entrance, the operating condition of the load device 20 is the condition of (25° C., medium). At this point of time, the evaluation result of the expected utility value with respect to the operation of the load device 20 is assumed to be not "R" in any of the agents 10A1, 10A2, and 10B. The agent 10A2 having the attribute of "sensitive to cold" and "attaching importance to energy-saving" has changed the judgment threshold twice due to the entrance of the agent 10B having the attribute of "sensitive to heat" and "attaching importance to comfort". The agent 10A2 having the attribute of "sensitive to cold" and "attaching importance to energy-saving" has performed the right restoration processing at the points at which periods 3T and 4T have passed since the entrance of the agent 10B having the attribute of "sensitive to heat" and "attaching importance to comfort", and has succeeded once, resulting in the accumulated value of the number of concessions being one, which is still the highest number of concessions.

Then, the agent 10A2 having the attribute of "sensitive to cold" and "attaching importance to energy-saving" again performs the right restoration processing, and proposes a condition of (26° C., strong) as the operating condition of the load device 20. At this point of time also, the evaluation result of the expected utility value is assumed to be "G" in each of the agent 10A1 having the attribute of "average" and "neutral" and the agent 10B having the attribute of "sensitive to heat" and "attaching importance to comfort". In this case, the agent 10A2 having the attribute of "sensitive to cold" and "attaching importance to energy-saving" instructs the operating condition of (26° C., strong) to the load device 20.

At a point of time when a period of 6T has passed since the entrance, the operating condition of the load device 20 is the condition of (26° C., strong). At this point of time, the evaluation result of the expected utility value with respect to the operation of the load device 20 is assumed not to be "R" in any of the agents 10A1, 10A2, and 10B. Since the agent 10A2 having the attribute of "sensitive to cold" and "attaching importance to energy-saving" has succeeded twice in the right restoration processing and the number of concessions is 0, the right restoration processing is not initiated. Therefore, the operating condition of the load device 20 is maintained at the condition of (26° C., strong).

Thereafter, each of the agents 10A1, 10A2, and 10B acquires the input parameter at given time intervals and re-examine the operating condition of the load device 20 using the acquired input parameter. If an evaluation result of the expected utility value is "R" in any of the agents 10, the agent 10 in which the evaluation result is "R" proposes a new operating condition of the load device 20, and operations described above such as proposal, acceptance/refusal, and right restoration are performed.

Figure 5:
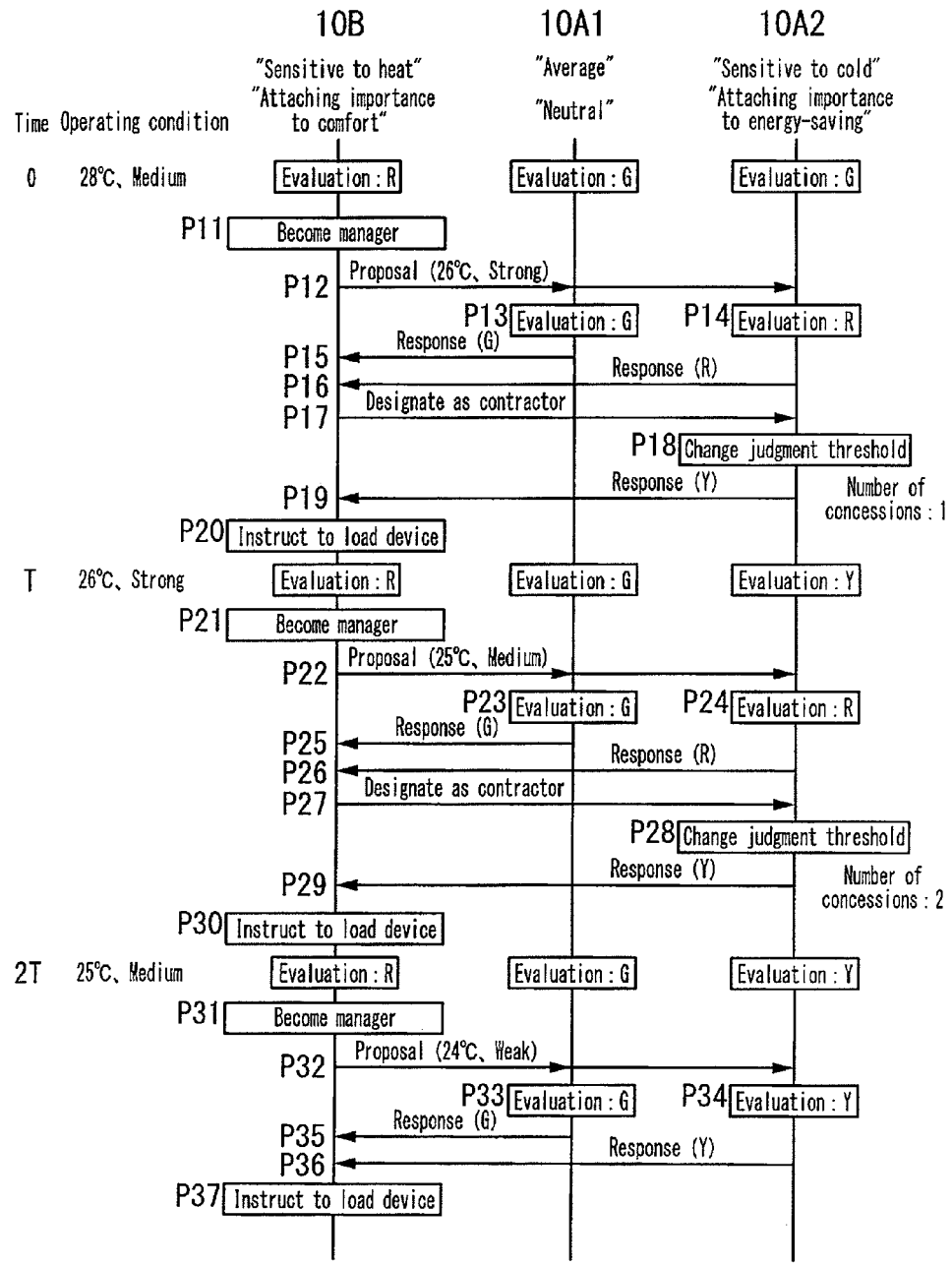
FIG. 5 is a diagram illustrating a part of an operation example of a device control system of the embodiment.
Figure 6:
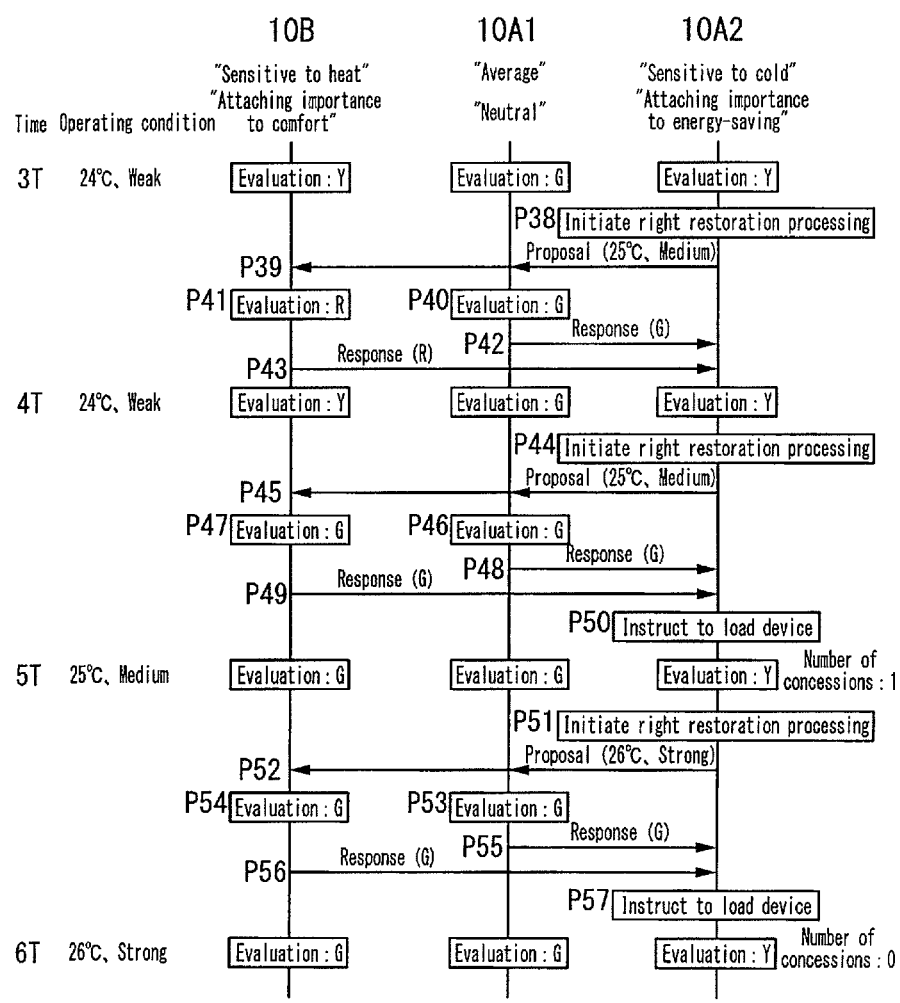
FIG. 6 is a diagram illustrating a continuation of the operation example in FIG. 5.

The aforementioned operations are summarized in FIGS. 5 and 6. In FIGS. 5 and 6, communication contents of the agents 10A1, 10A2, and 10B, relations of a manager and a contractor, operating conditions of the load device 20, and evaluation results of expected utility values are shown with respect to a period from the time when the user (third user) corresponding to the agent 10B enters the room (the time of entrance is shown as time "0") to the time when a period of 6T passes.

At the time of the entrance of the person entering the room (third user), the operating condition of the load device 20 is a condition of (28° C., medium), and the evaluation result is "G" in each of the agents 10A1 and 10A2 of the persons already in the room. Since the evaluation result of the expected utility value is "R" in the agent 10B of the person entering the room at the time of entrance, the agent 10B becomes a manager (P11). Then, the agent 10B of the person entering the room proposes a condition of (26° C., strong) as the operating condition of the load device 20 to the other agents 10A1 and 10A2 (P12).

Each of the agents 10A of the persons already in the room that has received the proposal from the agent 10B of the person entering the room calculates the expected utility value after the change and compares the expected utility value with the judgment thresholds. The evaluation result of the expected utility value with respect to the proposed operating condition of (26° C., strong) of the load device 20 is "G" in the agent 10A1 having the attribute of "average" and "neutral" (P13). The evaluation result of the expected utility value with respect to the proposed operating condition of (26° C., strong) of the load device 20 is "R" in the agent 10A2 having the attribute of "sensitive to cold" and "attaching importance to energy-saving" (P14). That is, the agent 10A1 having the attribute of "average" and "neutral" returns "G" to the manager (P15), and the agent 10A2 having the attribute of "sensitive to cold" and "attaching importance to energy-saving" returns "R" to the manager (P16).

The manager designates the agent 10A2 having the attribute of "sensitive to cold" and "attaching importance to energy-saving" that has returned "R" as a contractor (P17). The agent 10A2 that has been designated as the contractor changes the judgment threshold used for comparison with the expected utility value (P18), and stores 1 as the number of concessions. Here, since a case is assumed where the evaluation result of the expected utility value in the contractor becomes "Y" due to the change of the judgment threshold by the contractor, the contractor returns "Y" to the manager (P19).

If the evaluation result in the contractor becomes "Y", as described above, since the evaluation result in each of the agents 10A1 and 10A2 other than the manager is not "R", the manager instructs the proposed operating condition to the load device 20 (P20). That is, the operating condition of the load device 20 becomes the condition of (26° C., strong).

Thereafter, when the elapsed time since the entrance of the agent 10B becomes T, the agent 10B re-evaluates the expected utility value, and since the evaluation result is "R", the agent 10B becomes a manager again (P21). The manager proposes a condition of (25° C., medium) as the operating condition of the load device 20 to the other agents 10A1 and 10A2 (P22).

The evaluation result of the expected utility value with respect to the proposal is "G" in the agent 10A1 having the attribute of "average" and "neutral" (P23). The evaluation result of the expected utility value is "R" in the agent 10A2 having the attribute of "sensitive to cold" and "attaching importance to energy-saving" (P24). That is, the agent 10A1 having the attribute of "average" and "neutral" returns "G" to the manager (P25), and the agent 10A2 having the attribute of "sensitive to cold" and "attaching importance to energy-saving" returns "R" to the manager (P26).

The manager designates the agent 10A2 having the attribute of "sensitive to cold" and "attaching importance to energy-saving" that has returned "R" as a contractor (P27). The agent 10A2 that has been designated as the contractor changes the judgment threshold used for the comparison with the expected utility value (P28), increments the number of concessions by 1 and stores 2 (as the number of concessions). Here, since a case is assumed where the evaluation result of the expected utility value in the contractor becomes "Y" due to the change of the judgment threshold by the contractor, the contractor returns "Y" to the manager (P29).

If the evaluation result in the contractor becomes "Y", as described above, since the evaluation result in each of the agents 10A1 and 10A2 other than the manager is not "R", the manager instructs the proposed operating condition to the load device 20 (P30). That is, the operating condition of the load device 20 becomes the condition of (25° C., medium).

In the example shown in the diagram, even at a point of time when the elapsed time from the entrance becomes 2T, the evaluation result in the agent 10B of the person entering the room is "R", and as a result the agent 10B of the person entering the room becomes a manager (P31). The manager, similarly to the aforementioned operations, plans a condition of (24° C., weak) as an operating condition of the load device 20, and proposes the condition to the agents 10A1 and 10A2 of the persons already in the room (P32).

Here, the evaluation result of the expected utility value with respect to the proposal by the manager is "G" in the agent 10A1 having the attribute of "average" and "neutral" (P33). The evaluation result of the expected utility value is "Y" in the agent 10A2 having the attribute of "sensitive to cold" and "attaching importance to energy-saving" (P34).

That is, the agent 10A1 having the attribute of "average" and "neutral" returns "G" to the manager (P35), and the agent 10A2 having the attribute of "sensitive to cold" and "attaching importance to energy-saving" returns "Y" to the manager (P36).

When each of the agents 10A1 and 10A2 does not return an evaluation result of "R" to refuse the proposal from the manager as just described, the operating condition proposed by the manager is instructed to the load device 20 (P37) without designation of a contractor.

Due to performing the aforementioned operations, the expected utility values in the agents 10A1, 10A2, and 10B are settled to be in respective allowable ranges. At the point of time when a period of 3T passes since the entrance, the operating condition of the load device 20 is a condition of (24° C., weak), the evaluation result of the expected utility value is "Y" in the agent 10B of the person entering the room, and as a result the agent 10B of the person entering the room thereafter does not become a manager. Since the evaluation result is "G" in the agent 10A1 having the attribute of "average" and "neutral" and the evaluation result is "Y" in the agent 10A2 having the attribute of "sensitive to cold" and "attaching importance to energy-saving", each of the agents 10A1 and 10A2 of the persons already in the room does not become a manager.

Here, the number of concessions of the agent 10A2, which has been a contractor, having the attribute of "sensitive to cold" and "attaching importance to energy-saving" is 2, and as a result the right restoration processing is initiated as shown in FIG. 6 (P38). That is, the agent 10A2 having the attribute of "sensitive to cold" and "attaching importance to energy-saving" proposes a condition of (25° C., medium) whereby the expected utility value is increased as the operating condition of the load device 20 to the other agents 10A1 and 10B (P39). With respect to this proposal, the evaluation result is "G" in the agent 10A1 having the attribute of "average" and "neutral" (P40), and the evaluation result is "R" in the agent 10B having the attribute of "sensitive to heat" and "attaching importance to comfort" (P41). Accordingly, the agent 10A1 having the attribute of "average" and "neutral" returns the evaluation result of "G" (P42), and the agent 10B having the attribute of "sensitive to heat" and "attaching importance to comfort" returns "R" (P43). That is, the agent 10A2 having the attribute of "sensitive to cold" and "attaching importance to energy-saving" fails in the right restoration processing, and the operating condition of the load device 20 is maintained at the condition of (24° C., weak).

Thereafter, at the point of time when a period of 4T passes since the entrance of the agent 10B, the agent 10A2 having the attribute of "sensitive to cold" and "attaching importance to energy-saving" again initiates the right restoration processing (P44), and again proposes a condition of (25° C., medium) as the operating condition of the load device 20 (P45). With respect to this proposal, the evaluation result is "G" in the agent 10A1 having the attribute of "average" and "neutral" (P46), and the evaluation result is also "G" in the agent 10B having the attribute of "sensitive to heat" and "attaching importance to comfort" (P47). That is, a response of "G" is obtained from the agent 10A1 having the attribute of "average" and "neutral" (P48), and a response of "G" is also obtained from the agent 10B having the attribute of "sensitive to heat" and "attaching importance to comfort" (P49).

Accordingly, the agent 10A2 having the attribute of "sensitive to cold" and "attaching importance to energy-saving" instructs the operating condition of (25° C., medium) to the load device 20 (P50). Also, the agent 10A2 having the attribute of "sensitive to cold" and "attaching importance to energy-saving" decrements the number of concessions by 1, and as a result the number of concessions becomes 1.

Further, at the point of time when a period of 5T passes after the entrance, since the agent 10A2 having the attribute of "sensitive to cold" and "attaching importance to energy-saving" has one remaining concession resulting from having changed the judgment threshold twice and succeeded in the right restoration processing once, the agent 10A2 performs the right restoration processing again (P51), and proposes a condition of (26° C., strong) as the operating condition of the load device 20 (P52). With respect to this proposal, the evaluation result becomes "G" in each of the agent 10A1 having the attribute of "average" and "neutral" and the agent 10B having the attribute of "sensitive to heat" and "attaching importance to comfort" (P53 and P54), and each of the agents 10A1 and 10B returns a reply of "G" (P55 and P56). Accordingly, the agent 10A2 having the attribute of "sensitive to cold" and "attaching importance to energy-saving" instructs the operating condition of (26° C., strong) to the load device 20 (P57). At this step, the agent 10A2 having the attribute of "sensitive to cold" and "attaching importance to energy-saving" decrements the number of concessions by 1, and as a result the number of concessions becomes 0.

At the point of time when a period of 6T passes since the entrance, the operating condition of the load device 20 is the condition of (26° C., strong), and the number of concessions in the agent 10A2 having the attribute of "sensitive to cold" and "attaching importance to energy-saving" is 0. As a result, the operating condition of the load device 20 is maintained at the condition of (26° C., strong). Thereafter, as long as an event to change the operation of the load device 20 does not occur, the processing is repeated, in each of the agents 10A1, 10A2, and 10B, in which the expected utility value is calculated and is compared with the judgment thresholds.

In the example described above, description is given of a case where the operating condition of the load device 20 before the person entering the room enters the room was a condition of (28° C., medium), and at points of time when every time a period of T passes, the operating condition changes as follows: (26° C., strong)→(25° C., medium)→(24° C., weak)→(24° C., weak)→(25° C., medium)→(26° C., strong). Expected utility values calculated in the respective agents 10A1, 10A2, and 10B in this example are shown in FIG. 7. According to FIG. 7, the expected utility value of the agent 10B of the person entering the room (shown with rhombuses) is around 20 at the time of entrance and increases every time a period of T passes. On the other hand, the expected utility value of the agent 10A2 having the attribute of "sensitive to cold" and "attaching importance to energy-saving" (shown with squares) is around 60 before the entrance and decreases after the entrance of the person entering the room. The expected utility value of the agent 10A1 having the attribute of "average" and "neutral" (shown with triangles) is around 50 before the entrance and initially increases after the entrance of the person entering the room before decreasing.

In this way, in the aforementioned operation, due to the agents 10A1, 10A2, and 10B performing the response processing, difference in the expected utility value between the agents 10A1, 10A2, and 10B that correspond to respective users of the load device 20 decrease. That is, due to the agents 10A1, 10A2, and 10B that correspond to respective users making concessions, the operating condition of the load device 20 can be adjusted to a degree not to cause unsatisfaction in any of the users.

Incidentally, there may be a case where an appropriate adjustment becomes difficult if the person entering the room, being human, changes the operating condition of the load device 20 in a large degree for the purpose of only satisfying himself/herself, causing the persons already in the room to respond by trying to restore the operating condition to the original condition. In contrast, since the agent 10 being a manager changes the operating condition of the load device 20 so as to gradually change the expected utility value, as shown in FIG. 7, the agents 10 make concessions in small steps and the operating condition can be finally adjusted to an appropriate operating condition.

In the example shown in the diagram, at the point of time when a period of 3T passes since the entrance of the agent 10B having the attribute of "sensitive to heat" and "attaching importance to comfort", the expected utility value of the agent 10B of the person entering the room increases relative to the expected utility value at the time of entrance, and the expected utility values of the agents 10A1 and 10A2 of the persons already in the room decrease. That is, the expected utility values of all the agents 10A1, 10A2, and 10B approach each other and are adjusted so as to decrease the differences of the expected utility values.

Thereafter, in a period from a point of time when a period of 4T passes to a point of time when a period of 6T passes, the agent 10A2 having the attribute of "sensitive to cold" and "attaching importance to energy-saving" performs the right restoration processing, and the expected utility value of the agent 10A2 gradually increases. Similarly, in the example shown in the diagram, the expected utility value in the agent 10A1 having the attribute of "average" and "neutral" does not change in a large degree, and the expected utility value in the agent 10B having the attribute of "sensitive to heat" and "attaching importance to comfort" increases with the elapse of time. The increase of the expected utility value in the agent 10B having the attribute of "sensitive to heat" and "attaching importance to comfort" is partly caused by a change of the output value of node N1 (see FIG. 3) due to becoming accustomed to the room temperature with the elapse of time since the entrance.

Note that, as a reference, in a case where one person entering the room and two persons already in the room have respective attributes described above and negotiation is not performed among the agents 10A1, 10A2, and 10B, an example of changes of the expected utility values is shown in FIG. 8. That is, the attribute of one of the persons already in the room (first user) is "average" and "neutral", the attribute of the other person already in the room (second user) is "sensitive to cold" and "attaching importance to energy-saving", and the attribute of the person entering the room (third user) is "sensitive to heat" and "attaching importance to comfort". The operating condition of the load device 20 is a condition of (28° C., medium). Similarly to the example shown in FIG. 7, in FIG. 8, the line shown by the reference sign "10B" shows a change in the expected utility value in the person entering the room having the attribute of "sensitive to heat" and "attaching importance to comfort", the line shown by the reference sign "10A2" shows a change in the expected utility value in the person already in the room having the attribute of "sensitive to cold" and "attaching importance to energy-saving", and the line shown by the reference sign "10A1" shows a change in the expected utility value in the person already in the room having the attribute of "average" and "neutral".

When negotiations are not performed among the agents 10A1, 10A2, and 10B, that is, when each of the agents 10A1, 10A2, and 10B operates individually without cooperation, the operating condition of the load device 20 does not change and is maintained to be the condition of (28° C., medium). Therefore, as shown in FIG. 8, naturally, the difference in the expected utility value between the agents 10A1, 10A2, and 10B with respect to the environment cannot be reduced. Note that, the increase in the expected utility value in the agent 10B having the attribute of "sensitive to heat" and "attaching importance to comfort" in FIG. 8 is caused by a change of the output value of node N1 (see FIG. 3) due to becoming accustomed to the room temperature with the elapse of time since the entrance.

Note that, in the aforementioned operation, description is given to a case where the evaluation result in one of the agents 10 (10A1 and 10A2) of persons already in the room is "G" and the evaluation result in the other agents 10 (10A1 and 10A2) is "R". When the evaluation result is "R" in each of the agents 10, both of the agents 10 perform the following processing. That is, the agent 10 (10B) being a manager may designate both the agents 10 as contractors with respect to the proposed operating condition. Each of the agents 10 that are designated as the contractors makes a concession by changing the judgment threshold in the evaluation unit 161 following the above processing.

Incidentally, when a terminal device, such as a smartphone and a wearable computer, that is carried by a user at all times and includes various sensors such as an acceleration sensor is used as the device control apparatus, behavior and activity of the user can be automatically gathered. In this way, due to gathering records of the behavior and activity of the user and gathering records of instructions associated therewith by the user to a device such as temperature settings and airflow settings, accuracy to grasp the attribute of the user (such as warm-cold sense) can be improved. That is, the agent can judge so as to increase utility for the user by grasping the attribute of the user accurately. For example, if the agent knows the degree of difficulty of making a concession of the user, the agent can avoid a condition that is difficult for the user to permit as much as possible when the agent changes a condition in cooperation with other agent(s).

In the embodiment described above, the device control apparatus is described in a case where an air conditioner is controlled as an example. However, the device controlled by the device control apparatus is not limited to the air conditioner, and other devices such as a lighting device may be targets for control. For example, when a lighting device that is capable of not only dimming but also color adjustment is considered, since a lighting environment with a lighting intensity and color according to the user is required, using the agent to determine the lighting environment as a representative of the user as described above is useful.

Note that, in the exemplary configuration described above, although only a function of the agent has been described, the device control apparatus that is provided with the agent can be formed into various modes. For example, an apparatus with an appearance of a puppet can be configured. Similarly, when the device control apparatus is provided with a display such as a smartphone, an avatar of the user can be displayed on a screen. In this case, conferencing with the agent(s) of the other user(s) can be depicted by displaying a plurality of avatars on the screen.

Figure 9:
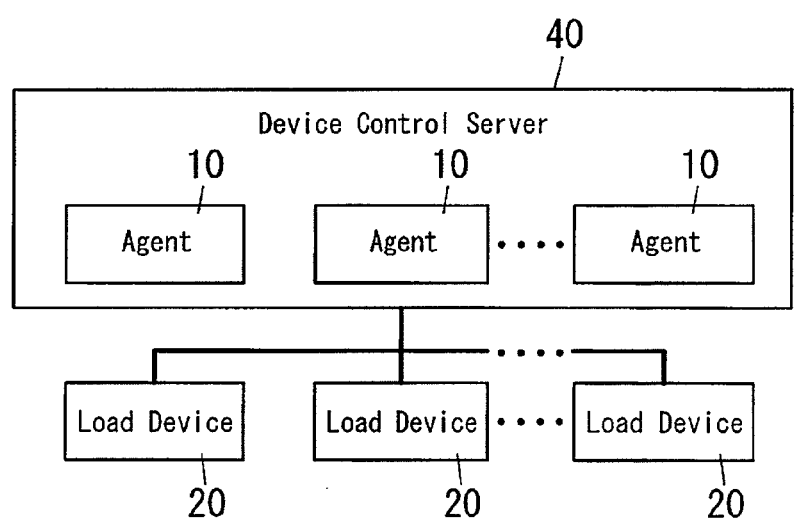
FIG. 9 is a schematic configuration diagram illustrating another configuration example of the device control system of the embodiment.

In the configuration described above, although the description has been given assuming the case where an agent of a user is provided in a terminal device that is carried by the user, a plurality of agents may be put together in one apparatus. For example, as shown in FIG. 9, a plurality of agents 10 can be installed in a device control server 40 that controls a plurality of load devices 20 by communication. Similarly, a plurality of agents 10 may be installed in a load device 20 (in this case, the load device 20 functions as the device control server).

In this configuration, for associating users with agents 10, each of the users can carry an identification medium capable of specifying the user such as RFID. In this case, each of agents 10 can be associated with the corresponding user who is identified by the identification medium. Similarly, an agent 10 can be associated with the corresponding user who is specified by using a technique of face recognition from an image taken in the room by a camera that is provided to capture images in the room. Alternatively, when a remote controller is used as the device control apparatus, a configuration may be used that enables a user who has operated the remote controller to be specified. For specifying a user who has operated the remote controller, a configuration in which a pre-registered identification number is inputted using an operating part of the remote controller or a configuration in which the remote controller has a recognition device to identify a user such as fingerprint authentication, can be adopted.

The invention claimed is:

1. A device control apparatus including an agent and for controlling a load device according to an operating condition of the load device determined by the agent that is associated with a user who is in a space in which an environment is controlled by the load device and that is realized as a representative of the user by a computer,
wherein the agent comprises:
an attribute setting unit configured to store an attribute of the user;
a condition input unit configured to receive an operating condition of the load device;
a utility value calculation unit configured to calculate an expected utility value indicating utility for the user with respect to the operating condition of the load device received through the condition input unit, using the attribute of the user, the expected utility value being expressed as a numerical value and expressing that a larger value thereof indicating a higher utility for the user; and
a cooperation processing unit configured to judge whether an operating condition of the load device is acceptable or not to the user by evaluating the expected utility value calculated for the user, and to uniquely determine, when there are a plurality of users in the space and if there is a user to whom the operating condition is not acceptable, an operating condition to be instructed to the load device, and
wherein the cooperation processing unit comprises:
an evaluation unit configured to classify the expected utility value into one of three levels of first to third cases, by comparing the expected utility value with a first judgment threshold and a second judgment threshold smaller than the first judgment threshold, where (a1) when larger than the first threshold, the expected utility value is judged as the first case indicating that the operating condition of the load device is desirable for the user, (a2) when smaller than the second threshold, the expected utility value is judged as the second case indicating that the operating condition of the load device is undesirable for the user, and (a3) when smaller than the first threshold and larger than the second threshold, the expected utility value is judged as the third case indicating that the operating condition of the load device is neither desirable nor undesirable for the user;

a planning unit configured to, when a result of the evaluation by the evaluation unit is the second case, plan an operating condition of the load device of which evaluation result of the expected utility value corresponds to the third case;

a proposing unit configured to propose a proposal including the operating condition of the load device planned by the planning unit to another agent that is a representative of other user, and instruct the operating condition of the load device planned by the planning unit when another agent acknowledges the proposal;

a response unit configured to, when the evaluation unit judges that the operating condition of the load device proposed by a proposing unit of another agent is the second case, return a response refusing the proposal to the agent that made the proposal;

a negotiation unit configured to, upon receiving a response refusing the proposal from a response unit of another agent, designate that the agent that made the proposal as a manager and the agent that refused the proposal as a contractor, and negotiate such that the evaluation result of the expected utility value becomes the first case or the third case in each of the manager and the contractor; and a consensus-building unit configured to, when the agent is designated as the contractor, lower the second judgment threshold within an acceptable range, and (b1) when the expected utility value is larger than the lowered second judgment threshold, acknowledge the proposal, and (b2) when the expected utility value is still smaller than the second judgment threshold lowered within the acceptable range, refuse the proposal, and wherein the manager is configured to when the proposal is acknowledged by the contractor, instruct, to the load device, the operating condition of the load device planned by the planning unit, and when the proposal is refused by the contractor, handle the operating condition planned by the planning unit as invalid and keep the load device to operate with a current operating condition.

2. The device control apparatus according to claim 1, wherein the agent limits a period in which the second judgment threshold is lowered to be until a point of time when a next evaluation of the expected utility value is performed, and restores the second judgment threshold to an original second judgment threshold at the point of time.

3. The device control apparatus according to claim 1, wherein the agent stores a number of times that the second judgment threshold has been lowered as a number of concessions, and increments the number of concessions by 1 every time the second judgment threshold is lowered.

4. The device control apparatus according to claim 3, wherein after the evaluation result of the expected utility value becomes the first case or the third case in each of the manager and the contractor, an agent which has been the contractor and which has the number of concessions of not 0 proposes, to the other agent, an operating condition of the load device that improves the expected utility value, and the cooperation processing unit of the agent decrements the number of concessions by 1 when a result of evaluation of the expected utility value in the other agent with respect to the proposed operating condition is the first case or the third case.

5. The device control apparatus according to claim 1, wherein each user is associated with one agent that is provided to a terminal device carried by the user, and the agents communicate with each other via wireless communication.

6. A program causing a computer to function as an agent, for controlling a load device according to an operating condition of the load device determined by the agent that is associated with a user who is in a space in which an environment is controlled by the load device and that is realized as a representative of the user by the computer, wherein the agent comprises:

an attribute setting unit configured to store an attribute of the user;

a condition input unit configured to receive an operating condition of the load device;

a utility value calculation unit configured to calculate an expected utility value indicating utility for the user with respect to the operating condition of the load device received through the condition input unit, using the attribute of the user, the expected utility value being expressed as a numerical value and expressing that a larger value thereof indicating a higher utility for the user; and a cooperation processing unit configured to judge whether an operating condition of the load device is acceptable or not to the user by evaluating the expected utility value calculated for the user, and to uniquely determine, when there are a plurality of users in the space and if there is a user to whom the operating condition is not acceptable, an operating condition to be instructed to the load device, and wherein the cooperation processing unit comprises:

an evaluation unit configured to classify the expected utility value into one of three levels of first to third cases, by comparing the expected utility value with a first judgment threshold and a second judgment threshold smaller than the first judgment threshold, where (a1) when larger than the first threshold, the expected utility value is judged as the first case indicating that the operating condition of the load device is desirable for the user, (a2) when smaller than the second threshold, the expected utility value is judged as the second case indicating that the operating condition of the load device is undesirable for the user, and (a3) when smaller than the first threshold and larger than the second threshold, the expected utility value is judged as the third case indicating that the operating condition of the load device is neither desirable nor undesirable for the user;

a planning unit configured to, when a result of the evaluation by the evaluation unit is the second case, plan an operating condition of the load device of which evaluation result of the expected utility value corresponds to the third case;

a proposing unit configured to propose a proposal including the operating condition of the load device planned by the planning unit to another agent that is a representative of other user, and instruct the operating condition of the load device planned by the planning unit when another agent acknowledges the proposal;

a response unit configured to, when the evaluation unit judges that the operating condition of the load device proposed by a proposing unit of another agent is the second case, return a response refusing the proposal to the agent that made the proposal;

a negotiation unit configured to, upon receiving a response refusing the proposal from a response unit of another agent, designate that the agent that made the proposal as a manager and the agent that refused the proposal as a contractor, and negotiate such that the evaluation result of the expected utility value becomes the first case or the third case in each of the manager and the contractor; and a consensus-building unit configured to, when the agent is designated as the contractor, lower the second judgment threshold within an acceptable range, and (b1) when the expected utility value is larger than the lowered second judgment threshold, acknowledge the proposal, and (b2) when the expected utility value is still smaller than the second judgment threshold lowered within the acceptable range, refuse the proposal, and wherein the manager is configured to when the proposal is acknowledged by the contractor, instruct, to the load device, the operating condition of the load device planned by the planning unit, and when the proposal is refused by the contractor, handle the operating condition planned by the planning unit as invalid and keep the load device to operate with a current operating condition.

7. A device control server on which agents that respectively represent a plurality of users are installed, for controlling a load device according to an operating condition of the load device determined by the agent that is associated with a user who is in a space in which an environment is controlled by the load device and that is realized as a representative of the user by a computer, wherein the agent comprises:

an attribute setting unit configured to store an attribute of the user;

a condition input unit configured to receive an operating condition of the load device;

a utility value calculation unit configured to calculate an expected utility value indicating utility for the user with respect to the operating condition of the load device received through the condition input unit, using the attribute of the user, the expected utility value being expressed as a numerical value and expressing that a larger value thereof indicating a higher utility for the user; and a cooperation processing unit configured to judge whether an operating condition of the load device is acceptable or not to the user by evaluating the expected utility value calculated for the user, and to uniquely determine, when there are a plurality of users in the space and if there is a user to whom the operating condition is not acceptable, an operating condition to be instructed to the load device, and wherein the cooperation processing unit comprises:

an evaluation unit configured to classify the expected utility value into one of three levels of first to third cases, by comparing the expected utility value with a first judgment threshold and a second judgment threshold smaller than the first judgment threshold, where (a1) when larger than the first threshold, the expected utility value is judged as the first case indicating that the operating condition of the load device is desirable for the user, (a2) when smaller than the second threshold, the expected utility value is judged as the second case indicating that the operating condition of the load device is undesirable for the user, and (a3) when smaller than the first threshold and larger than the second threshold, the expected utility value is judged as the third case indicating that the operating condition of the load device is neither desirable nor undesirable for the user;

a planning unit configured to, when a result of the evaluation by the evaluation unit is the second case, plan an operating condition of the load device of which evaluation result of the expected utility value corresponds to the third case;

a proposing unit configured to propose a proposal including the operating condition of the load device planned by the planning unit to another agent that is a representative of other user, and instruct the operating condition of the load device planned by the planning unit when another agent acknowledges the proposal;

a response unit configured to, when the evaluation unit judges that the operating condition of the load device proposed by a proposing unit of another agent is the second case, return a response refusing the proposal to the agent that made the proposal;

a negotiation unit configured to, upon receiving a response refusing the proposal from a response unit of another agent, designate that the agent that made the proposal as a manager and the agent that refused the proposal as a contractor, and negotiate such that the evaluation result of the expected utility value becomes the first case or the third case in each of the manager and the contractor; and a consensus-building unit configured to, when the agent is designated as the contractor, lower the second judgment threshold within an acceptable range, and (b1) when the expected utility value is larger than the lowered second judgment threshold, acknowledge the proposal, and (b2) when the expected utility value is still smaller than the second judgment threshold lowered within the acceptable range, refuse the proposal, and wherein the manager is configured to when the proposal is acknowledged by the contractor, instruct, to the load device, the operating condition of the load device planned by the planning unit, and when the proposal is refused by the contractor, handle the operating condition planned by the planning unit as invalid and keep the load device to operate with a current operating condition.

8. A device control system including an agent and for controlling a load device according to an operating condition of the load device determined by the agent that is associated with a user who is in a room in which an environment is controlled by the load device and that is realized as a representative of the user by a computer, the device control system comprising:

an entrance and exit sensor that is configured to monitor an entrance to and exit from the room of the user, wherein the agent comprises:

an entrance and exit monitoring unit that is notified of an entrance and exit of the user who is represented by the agent from the entrance and exit sensor;

an attribute setting unit configured to store an attribute of the user;

a condition input unit configured to receive an operating condition of the load device;

a utility value calculation unit configured to calculate an expected utility value indicating utility for the user with respect to the operating condition of the load device received through the condition input unit, using the attribute of the user, the expected utility value being expressed as a numerical value and expressing that a larger value thereof indicating a higher utility for the user; and a cooperation processing unit configured to judge whether an operating condition of the load device is acceptable or not to the user by evaluating the expected utility value calculated for the user, and to uniquely determine, when there are a plurality of users in the space and if there is a user to whom the operating condition is not acceptable, an operating condition to be instructed to the load device, and wherein the cooperation processing unit comprises:

an evaluation unit configured to classify the expected utility value into one of three levels of first to third cases, by comparing the expected utility value with a first judgment threshold and a second judgment threshold smaller than the first judgment threshold, where (a1) when larger than the first threshold, the expected utility value is judged as the first case indicating that the operating condition of the load device is desirable for the user, (a2) when smaller than the second threshold, the expected utility value is judged as the second case indicating that the operating condition of the load device is undesirable for the user, and (a3) when smaller than the first threshold and larger than the second threshold, the expected utility value is judged as the third case indicating that the operating condition of the load device is neither desirable nor undesirable for the user;

a planning unit configured, upon being notified an entrance of the user from the entrance and exit monitoring unit, to obtain an evaluation result by the evaluation unit and to plan, when a result of the evaluation by the evaluation unit is the second case, an operating condition of the load device of which evaluation result of the expected utility value corresponds to the third case;

a proposing unit configured to propose a proposal including the operating condition of the load device planned by the planning unit to another agent that is a representative of other user, and instruct the operating condition of the load device planned by the planning unit when another agent acknowledges the proposal;

a response unit configured to, when the evaluation unit judges that the operating condition of the load device proposed by a proposing unit of another agent is the second case, return a response refusing the proposal to the agent that made the proposal;

a negotiation unit configured to, upon receiving a response refusing the proposal from a response unit of another agent, designate that the agent that made the proposal as a manager and the agent that refused the proposal as a contractor, and negotiate such that the evaluation result of the expected utility value becomes the first case or the third case in each of the manager and the contractor; and a consensus-building unit configured to, when the agent is designated as the contractor, lower the second judgment threshold within an acceptable range, and (b1) when the expected utility value is larger than the lowered second judgment threshold, acknowledge the proposal, and (b2) when the expected utility value is still smaller than the second judgment threshold lowered within the acceptable range, refuse the proposal, and wherein the manager is configured to when the proposal is acknowledged by the contractor, instruct, to the load device, the operating condition of the load device planned by the planning unit, and when the proposal is refused by the contractor, handle the operating condition planned by the planning unit as invalid and keep the load device to operate with a current operating condition.

9. The device control apparatus according to claim 2, wherein the agent stores a number of times that the second judgment threshold has been lowered as a number of concessions, and increments the number of concessions by 1 every time the second judgment threshold is lowered.

10. The device control apparatus according to claim 9, wherein after the evaluation result of the expected utility value becomes the first case or the third case in each of the manager and the contractor, an agent which has been the contractor and which has the number of concessions of not 0 proposes, to the other agent, an operating condition of the load device that improves the expected utility value, and the cooperation processing unit of the agent decrements the number of concessions by 1 when a result of evaluation of the expected utility value in the other agent with respect to the proposed operating condition is the first case or the third case.

11. The device control apparatus according to claim 2, wherein each user is associated with one agent that is provided to a terminal device carried by the user, and the agents communicate with each other via wireless communication.

12. The device control apparatus according to claim 3, wherein each user is associated with one agent that is provided to a terminal device carried by the user, and the agents communicate with each other via wireless communication.

13. The device control apparatus according to claim 4, wherein each user is associated with one agent that is provided to a terminal device carried by the user, and the agents communicate with each other via wireless communication.

14. The device control apparatus according to claim 9, wherein each user is associated with one agent that is provided to a terminal device carried by the user, and the agents communicate with each other via wireless communication.

15. The device control apparatus according to claim 10, wherein each user is associated with one agent that is provided to a terminal device carried by the user, and the agents communicate with each other via wireless communication.

* * * * *